(12) United States Patent
Conroy

(10) Patent No.: US 8,327,748 B2
(45) Date of Patent: Dec. 11, 2012

(54) ROBOTIC DEFILADE SYSTEM

(76) Inventor: Vincent Paul Conroy, Tallahassee, FL (US)

( * ) Notice: Subject to any disclaimer, the term of this patent is extended or adjusted under 35 U.S.C. 154(b) by 1337 days.

(21) Appl. No.: 11/986,743

(22) Filed: Nov. 26, 2007

(65) Prior Publication Data

US 2012/0173045 A1    Jul. 5, 2012

(51) Int. Cl.
*F41H 7/00* (2006.01)
(52) U.S. Cl. ....................... 89/36.02; 89/36.07
(58) Field of Classification Search ............. 361/47; 89/36.02, 36.07, 36.09
See application file for complete search history.

(56) References Cited

U.S. PATENT DOCUMENTS

| | | | |
|---|---|---|---|
| 5,020,411 A * | 6/1991 | Rowan | 89/1.11 |
| 5,995,882 A | 11/1999 | Patterson et al. | |
| 6,367,345 B1 | 4/2002 | Yeh | |
| 6,431,296 B1 | 8/2002 | Won | |
| 6,548,982 B1 | 4/2003 | Papauikolopoulos | |
| 6,738,714 B2 | 5/2004 | McCall et al. | |
| 6,859,729 B2 | 2/2005 | Breakfield et al. | |
| 6,895,301 B2 | 5/2005 | Mountz | |
| 7,211,980 B1 | 5/2007 | Bruemmer et al. | |
| 7,954,411 B2 * | 6/2011 | Odhner et al. | 89/1.11 |
| 2006/0164282 A1 | 7/2006 | Duff et al. | |
| 2007/0233337 A1 | 10/2007 | Plishner | |
| 2010/0163341 A1 * | 7/2010 | Fuqua | 182/129 |
| 2010/0294122 A1 * | 11/2010 | Hoadley et al. | 89/36.02 |

OTHER PUBLICATIONS

Carleone, Joseph; *Tactical Missile Warheads*; copyright 1993, Third Printing; whole book was general reference; published by American Institute of Aeronautics ad Astronautics; Washington, DC.
Walters, William; "An Overview of the Shaped Charge Concept;" paper presented at 11th AUTS, USMA, West Point, NY; date unknown.

* cited by examiner

*Primary Examiner* — Danny Nguyen

(57) ABSTRACT

A stout wall assembly which self-transports under remote control or onboard machine logic is disclosed. It combines three very well understood and proven technologies into a novel, new military system for creating protected positions behind very strong cover while a formation is in motion or stationary. The wall assembly is unmanned and is designed to sacrificially block any destructive effects directed at the protected object in its lee. It provides a non-pyrotechnical, passive, always-on, solid, physical barrier defense with no reaction or recycle time whatsoever, an unlimited duty cycle, and minimal possibility of fratricide or collateral damage. It can defeat or degrade kinetic energy, blast, fragmentation, fire, particulate, shaped charge, and high explosive squash head weapons and is uniquely capable against street-level improvised explosive devices.

6 Claims, 26 Drawing Sheets

| Level 1 is Surface Vehicle System ||
|---|---|
| Level 2 | Level 3 |
| Primary Vehicle | • Hull/Frame<br>• Suspension/Steering<br>• Power Package/Drive Train<br>• Auxiliary Automotive<br>• Turret Assembly<br>• Fire Control<br>• Armament<br>• Body/Cab<br>• Automatic Loading<br>• Automatic/Remote Piloting<br>• Nuclear, Biological, Chemical<br>• Special Equipment<br>• Navigation<br>• Communications<br>• Primary Vehicle Application Software<br>• Primary Vehicle System Software<br>• Vetronics<br>• Integration, Assembly, Test and Checkout |

FIG. 5a
Prior Art

| Level 1 is Surface Vehicle System ||
|---|---|
| Level 2 | Level 3 |
| Secondary Vehicle | Same as primary vehicle |
| Systems Engineering/ Program Management | |
| System Test and Evaluation | • Development Test and Evaluation<br>• Operational Test and Evaluation<br>• Mockups/System Integration Labs (SILs)<br>• Test and Evaluation Support<br>• Test Facilities |
| Training | • Equipment<br>• Services<br>• Facilities |
| Data | • Technical Publications<br>• Engineering Data<br>• Management Data<br>• Support Data<br>• Data Depository |

FIG. 5b
Prior Art

| Level 1 is Surface Vehicle System ||
|---|---|
| Level 2 | Level 3 |
| Peculiar Support Equipment | • Test and Measurement Equipment<br>• Support and Handling Equipment |
| Common Support Equipment | • Test and Measurement Equipment<br>• Support and Handling Equipment |
| Operational Site Activation | • System Assembly, Installation and Checkout on Site<br>• Contractor Technical Support<br>• Site Construction<br>• Site/Ship/Vehicle Conversion |
| Industrial Facilities | • Construction/Conversion/Expansion<br>• Equipment Acquisition or Modernization<br>• Maintenance (Industrial Facilities) |
| Initial Spares and Repair Parts | |

FIG. 5c
Prior Art

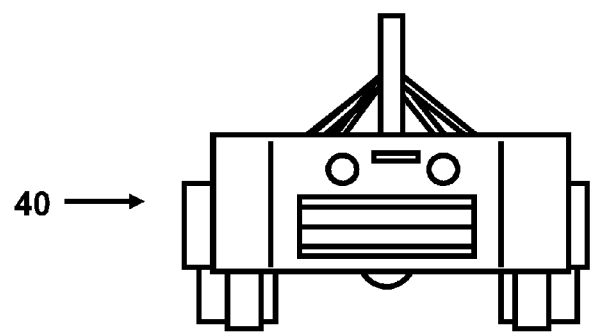
FIG. 8a
FIG. 8b
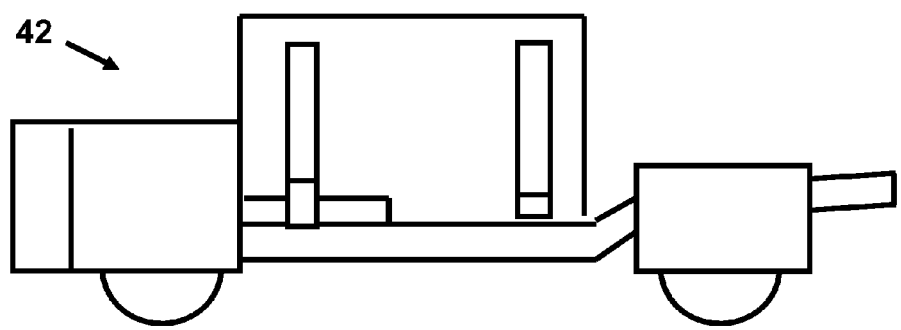
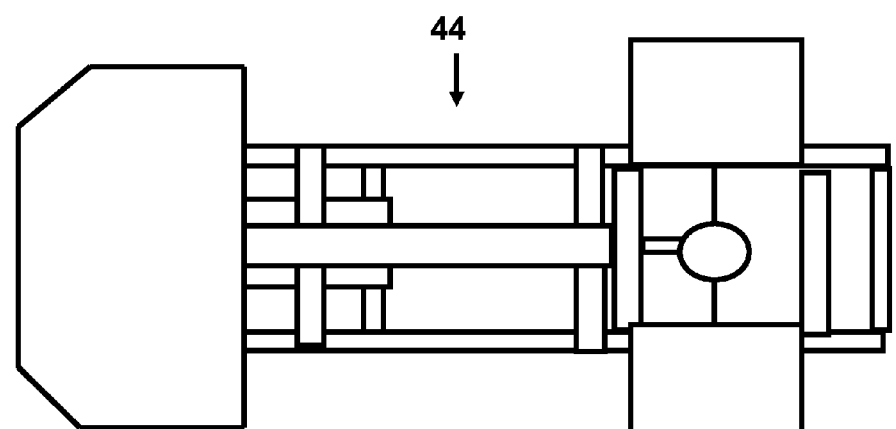
FIG. 8c

| Weight Budget for Vehicle Body Armor Configuration Items ||||||
|---|---|---|---|---|---|
| (Density of steel 20.4 lb/sq ft for 0.5 inch thick) ||||||
| Assembly | Item | Steel | # | Dimensions | Pounds |
| Front end armor | Nose Sheet | 0.5 in | 1 | 6 ft W x 3.4 ft H | 416 |
| | Front wings | 0.5 in | 2 | 3.4 ft H x 1.7 ft W | 236 |
| | Front sides | 0.5 in | 2 | 3.4 ft H x 3.4 ft W | 472 |
| | Engine cover | 0.25 in | 1 | 4.8 ft W x 6 ft H less 2 triangular corners 1 ft x 1.33 ft | 294 |
| | Aft close outs | 0.5 in | 2 | Assume 1/3 the size of the front sheet | 139 |
| | Total | | | | 1557 |
| Transmission Armor | Cover | 0.25 in | 1 | 2.5 ft W x 1 ft H | 26 |
| | Sides | 0.5 in | 2 | 2.5 ft W x 1 ft H | 102 |
| | Aft end | 0.5 in | 1 | 1 ft W x 1 ft H | 20 |
| | Total | | | | 148 |
| Rear wheel armor | Side sheet | 0.5 in | 2 | 3.3 ft W x 2.1 ft H | 283 |
| | Top sheet | 0.25 in | 2 | 3.3 ft W x 2.8 ft H | 188 |
| | Fore sheet | 0.5 in | 2 | 2.8 ft W x 2.1 ft H | 240 |
| | Aft sheet | 0.5 in | 2 | 2.8 ft W x 2.1 ft H | 240 |
| | Inside sheet | 0.25 in | 2 | 3.3 W x 1.7 ft H | 114 |
| | Total | | | | 1065 |
| Underside protection | Aft lat uside keep out | 0.5 in | 1 | 1.25 ft H x 5 ft W | 128 |
| Total | | | | | 2898 |

FIG. 12

| Vehicle Capabilities for Carrying Armor Kits ||||||
| --- | --- | --- | --- | --- | --- |
| Vehicle | Payload | Vehicle Armor | Allowance for Structure | Remainder Available for Barrier | Barrier Thickness |
| F-350 single rear wheel chassis cab | 4,700 | 2,688 | 1,344 | 668 | < 1 inch |
| F-350 dual rear wheel (DRW) chassis cab | 6,700 | 2,898 | 1,449 | 2,353 | ~ 2 inches |
| F-450 DRW chassis cab | 9,100 | 2,898 | 1,449 | 4,753 | 3.5 inches |
| F-550 DRW chassis cab | 11,000 | 2,898 | 1,449 | 6,653 | ~ 5 inches |
| F-650 Kick Up Frame chassis cab | 18,186 | Not calculated ||||
| F-650 Straight Frame chassis cab | 20,800 | |||| 
| F-750 chassis cab | 24,433 | ||||

FIG. 13

ROBOTIC DEFILADE SYSTEM

CROSS-REFERENCE TO RELATED APPLICATIONS

PPA No. 60/861,468

FEDERALLY SPONSORED RESEARCH

None

SEQUENCE LISTING

None

BACKGROUND OF THE INVENTION

1. Field of Invention

This invention generally relates to the fields of military vehicles and topographic engineering.

2. Prior Art

Military defilade is where a person or a vehicle is covered from enemy fire and concealed from observation by a physical feature such as a hilltop. Historically the ability for one side in a skirmish to fire from behind a strong wall upon an enemy who is exposed upon an open field has proven a major, sometimes pivotal, advantage for the former.

The current scourge of counter insurgency operations is the roadside bomb, frequently an improvised explosive device, or IED, constructed of a package of 155 mm howitzer shells or an anti-armor shaped charge. Triggered by remote control, they inspire fear and have been very successful in impeding commerce and communications in Iraq and Afghanistan. An ideal response would be to be able to shelter vehicles behind a moving hill top or stone wall which would move in formation with our trucks seemingly on its own, ready to block the shots that otherwise would hit one of our manned vehicles.

There is no system with these capabilities or a similar sacrificial mission. Tanks and APCs can be used in blocking positions, but such a usage is exceptional. Available defensive armor and add-on protective systems do not fully meet the Requirements. Nonetheless, without an illuminating, seminal event from outside the defense community, it is unlikely that such a system will be envisioned and developed. Unmanned ground vehicles, or UGVs, are being widely developed but only for active roles too dangerous for people. Such roles include shooting weapons, searching for mines, and performing chemical warfare or radiation sampling. Active roles which eliminate dangers to humans win developmental funding; it is hard to win money for simply being in the right place. Furthermore, since the unit price could be less than $100,000, industry will not speculatively develop such a product. The delay in deploying unmanned aerial vehicles after the Israelis used them so well in the Bekaa Valley is instructive in that regard.

Two references that will be cited later on are (1) "An Overview of the Shaped Charge Concept," William Walters, USMA, 11th AUTS, date unknown and (2) *Tactical Missile Warheads*; edited by Dr. Joseph Carleone; American Institute of Astronautics and Aeronautics; © 1993. Citations will use the acronym *TMW*.

Requirements: Vehicles to be Protected

The requirement is to protect light armored vehicles and utility trucks and the people within them. The degree of protection sought is occupant survival without permanent injuries. The models are the M109 High Mobility Multi-Purpose Wheeled Vehicle, or HMMWV, and the Stryker armored vehicle. The HMMWV is approximately 15.8 feet long and 6.2 feet high, and it has a ground clearance of 1.5 feet. The flat vertical area from the bottom of the cab and along the longitudinal axis to be screened is estimated to be 5 feet high and 7 feet long. Stryker is an eight wheeled vehicle approximately 10.3 feet high and 24 feet long. The flat vertical area along the longitudinal axis to be screened is estimated to be 7 feet high and 18 feet long. The area to be protected in the Stryker is 3.6 as large an area as that for the HMMWV. Given that one square foot of armor steel which is one inch thick weighs approximately 41 pounds, a single plate to protect each would weigh 5,200 pounds for the armored vehicle and 1,435 pounds for the utility truck. For greater plate thickness the weight goes up approximately proportionately.

Requirements: Weapons to be Defeated

There are five conventional kill mechanisms to be addressed: bullets and kinetic energy projectiles; fragments of warheads; blast; fire; and all the variants of shaped charge warheads. All these weapons need a direct path to the target for full effectiveness although blast and flames may be able to partially envelop the obstacle.

Kinetic energy weapons are solid projectiles traveling at extremely high speed. They are usually small darts of very dense, rigid material with fineness ratios on the order of 9 to 1. They are a very efficient way to transfer a very large amount of energy to a very small spot on the target. Depleted uranium, about 2.5 times as dense as steel rolled homogeneous armor, or steel RHA, is popular for KE penetrators. The most powerful KE projectiles are fired from the barrels of main battle tanks. The 10 pound penetrator of the 120 mm armor penetrating fin stabilized discarding sabot with tracer (APFSDS-T) is reported to travel at 1.7 km/sec. The one-half pound 30 mm Bushmaster APFSDS-T penetrator and the 1.5 pound 30 mm Bushmaster armor piercing incendiary penetrator are reported to travel at 1.4 km/sec and 1 km/sec, respectively. Fire weapons include flame throwers, Molotov cocktails, and napalm aerial bombs. There are three variants of shaped charges. Each has a hollow space at the front which is enclosed on the sides and back by a metal liner, usually copper. Enveloping the liner from the back end is the main explosive charge. The primary difference between the three being the shape of their liners, they are called the acutely conical liner configuration, the hemispherical liner configuration, and the explosively formed projectile, or EFP. EFP also means explosively forged penetrator.

FIGS. 1*a*, 1*b*, and 1*c* depict the three shaped charge warheads and their liners in that order. In all three the force of the explosion of the main charge fills the liner with an extraordinary amount of energy. This energy causes the liner to collapse inward toward a focal point where it creates a kill mechanism shaped according to how wide or how narrow was the separation of the sides of the liner. Acutely conical liners have included angles of 42 to 60 degrees. Upon the detonation the liner forms two products: a incompressible, fluid stream of metal and a shapeless mass. The stream is called the jet. It is about ¼ inch in diameter, encompasses about 15% of the original liner mass, and travels forward at speeds between 10 km/sec at the tip and 2 km/sec at the tail. (Carleone, *TMW*, p. 66, and Chi, *TMW*, p. 465) The shapeless mass, called the slug, encompasses the other 85% of the liner and travels at 1 km/sec. (Williams, p. 2) EFPs, on the other hand, form only one product. The liner angle in an EFP is wide enough that the jet and the slug do not separate but instead form a dart containing virtually all the mass of the liner and travelling at 1.5-3 km/sec. Shaped charges kill primarily by kinetic energy transfer in the products. An acutely conical liner's jet exerts a pressure of millions of pounds per square inch at the tip.

When it hits armor, it hydrodynamically erodes its way forward. The shock wave preceding it tears the inside surface of the armor off and shotguns it through the crew compartment as spall. The main kill mechanism is for the jet to emerge inside the armor with enough kinetic energy left to detonate the target's fuel or ammunition. Of the three shaped charges this variant has by far the greatest very hard armor penetration capability. Against such targets an acutely conical design needs to be detonated within about ten times its charge diameter, or CD, for full effectiveness, which is typically five feet or closer. Due to the mechanics of jet formation, about five CDs of standoff is optimal. Against thin armor a greater engagement range is acceptable. For an EFP the kill mechanism is the hypersonic dart. It has much less penetration capability against the hardest, thickest armor, but it can be used against thinner armor from over 150 meters away. Warheads with hemispherical liners are between the other two in liner angles and performance.

The full list of specific weapons that employ these mechanisms encompasses virtually every weapon on the battlefield.

Machine guns

Cannons, both automatic and non-automatic

Rocket-propelled grenades (RPG)

Anti-tank missiles and rockets including recoilless rifle and bazooka projectiles Bunker buster missiles and rockets Mortar and artillery rounds Aerial bombs of all types Claymore mines and similar blast-fragmentation infantry pyrotechnic devices Flame throwers and Molotov cocktails Improvised explosive devices (IED)

Rocket propelled grenades, anti-tank missiles and rockets, and bunker buster missiles and rockets range from about 60 mm up to about 105 mm in diameter. They generally travel at about 300 msec. Compared to automatic cannon projectiles, they are two to five times as large in diameter and travel at ⅕ to ⅓ the speed. Automatic cannons fire at rates from about 100 rounds per minute to over 1,000 rounds per minute, depending on the specific cannon installation.

As identified earlier, the IED may be the most important of the collection. They have established themselves as powerful psychological weapons, simultaneously iconic for the special hazards of modern counter-insurgency and a dramatic new symbol of the malefactors' destructive power. The extent of the threat from an IED depends on the specific vehicle, its equipment, the specific configuration of the weapon, and the engagement details. Many of the early IEDs in Iraq were stolen 155 mm artillery shells bound together, hidden adjacent to roadways, and detonated when vehicles of interest passed alongside. Even a single six inch shell has a terrible capability; the blast intensity and the density and penetration of fragmentation from a packet is extraordinary.

The weapons to be countered include all current and prior configurations of all the weapons cited and also all their future, improved versions, including those designed specifically to defeat protective armor systems. For defeating protective systems three weapons types are of interest: warheads detonated prior to the target, weapons with included decoys, and dispenser munitions.

Two general approaches used to detonate weapons prior to the target are proximity sensing and time fusing. Both approaches initiate the warhead at a stand-off because it allows a more powerful detonation, creates a more lethal pattern of fragments, or both. As noted, anti-tank shaped charge warheads have a much higher penetration capability when detonated at about five CD from the target instead of on contact. Proximity-fused anti-aircraft projectiles, a standard for U.S. Navy guns since World War II, use proximity fusing for optimal fragment dispersal.

Proximity sensing can be done mechanically, by radio signals, magnetically, and electro-optically. A very widely fielded mechanical proximity sensor is the extensible probe used by the Improved TOW, TOW 2, and TOW 2A missiles. The sensor is a short pole of different specific designs mounted within the missile nose until after launch. After launch it is extended forward and held ahead of the nose. A hard contact by the probe establishes that the missile has reached the desired detonation point and triggers the warhead fuse. Radio frequency sensing is the method for the Navy Mark 53 anti-aircraft fuse. Naval mines frequently use magnetic fusing. Preset time fuses achieve the same results when the distance to the target can be determined and then the time to an optimum detonation calculated and set into the fuse before firing.

Proximity fusing and time fusing from known ranges inject new challenges into the design of on-vehicle defense systems. Shoot-down systems that intercept incoming weapons "in extremis," meaning immediately before impact, are seriously degraded by any method of standoff fusing. Even a successful hit by the defensive system upon a mechanical proximity fuse may not prevent successful initiation of the warhead anyway. Moreover, non-mechanical proximity fuses and preset time fuses may initiate the warhead of the inbound, attacking missile even before any part of that weapon physically enters the defending system's intercept zone.

Decoys can be used to create time gaps in shoot-down systems. In the new Russian RPG-30 the decoy is a precursor munition that precedes the real munition. It is intended to trigger the vehicle defense system into firing at it. The real weapon follows far enough back to survive the counter fire but closely enough that a new interceptor cannot be launched in time. The company that builds the RPG-30 markets it based on this feature. Of course, the use of decoys is not at all a new tactic; using precursor decoys in advanced RPGs is just a new application.

Dispenser munitions work like a transport bus. After firing or release they travel toward the target and, at some point en route, disgorge separate, smaller kill vehicles, which may be explosive munitions or kinetic energy darts. An example is the fleschette warhead. It transports darts to a preset distance and then releases them to spread to an optimal density before impact. Darts are of different sizes, and heavy darts are massively destructive against light armor. Dispenser weapons challenge the shoot-down active protection systems because the latter must either kill the dispenser prior to release of its cargo, or it must kill all the separate kill vehicles.

Existing Defenses and Their Constraints

There are no unmanned, guided, self-propelled vehicles with a dedicated mission of providing passive protection by being a physical barrier against weapons. At present there are only point defenses on the targets themselves. Against many of the weapons previously cited these point defense systems have no capability.

Tanks and APC's can be utilized as tactical barriers, and it is not uncommon to see such being done in places where maximum security is in effect. During a popular uprising, for example, one highly visible demonstrator of the government's control is to park a couple of tanks in major intersections or to ring the palace with tanks and APC's. These vehicles, however, are highly suboptimal choices for such screening on a wide battlefield or even for wide use in an urban area. Tanks are relatively few in number, and their unique characteristics are largely wasted in blocking positions except of the most important nature. They have extremely high consumption rates for fuel; they require a lot of maintenance; and their sheer size limits their ability to move in urban areas. Further, in urban areas their mere passage tends to do a lot of damage. APC's, on the other hand, have these problems to a much lower degree. Their armor, though, is so thin that many of them cannot effectively shield against all the weapons needed to be defeated. Some of these weapons can shoot right through an APC and still kill the target on the other side. Further the replacement price for both tanks and APC's is too high to allow them to be used freely as sacrificial barriers.

The point defenses to defeat the threats identified include integrated forms of armor and a variety of defensive mechanisms to reduce the attackers' penetration capabilities without adding as much weight as solid metal armor. In very heavy vehicles armor mass has traditionally been provided with steel RHA. In lighter armored vehicles sometimes aluminum armor is used. Despite their massiveness neither of these defenses is sufficient in itself. The closest thing to impenetrable armor is depleted uranium, or DU, armor, which proved itself virtually invulnerable in the Gulf Wars. The problems with providing more defensive capabilities by adding more metal armor include the obvious, negative impact on expense, mobility, fuel consumption, and vehicle maintenance and durability. The most effective option to date, attachable kits of depleted uranium, suffers all these detriments to elevated degrees plus it has unique and severe environmental and political issues.

The less massive approaches include layered armor, explosive reactive armor (ERA), and several externally mounted devices. Layered armor, also called Chobham armor and composite armor, relies on a combination of shock absorption by ceramic plates and, for fluid metal streams, refraction in non-orthogonal layers of different materials. In an ERA system a number of boxes of explosives are mounted on the vehicle exterior. They feature heavy top and bottom plates. When the attacking weapon strikes the ERA box it detonates the explosive which in turn flings the heavy top and bottom plates outward. The penetrator may be impacted by either or both of these interceptors, in which event it may be partially de-energized and partially deflected. There are also some disruptive turbulence effects that linger from the explosion of the box itself. The other devices include a variety of designs to dissipate the energy or otherwise reduce the penetrating power of the kill mechanism. This includes spall liners, which are curtains of fragment resistant fibers emplaced against the inside walls of a target. They prevent the spall created by a strike from being able to spread out unchecked into the compartment. Some composite materials have an increased ability to withstand the metal stream due to their compressibility.

ERA poses a severe threat itself to damage the vehicle on which it rides, especially if there is sympathetic detonation between multiple explosive boxes. It inherently endangers any friendly troops and vehicles nearby, and there are other issues as well.

There are active vehicle defensive systems that are designed to prevent or degrade an attack by intercepting the missile or RPG inbound before it can impact. They are sometimes called hard kill systems. They shoot down the inbound weapon. They fall into two categories, the fly out systems and the "in extremis" systems. Fly out systems launch interceptors to destroy the inbound weapon at a safe distance. Examples of this are the Russian Drozd and Arena systems and the Israeli Trophy system. "In extremis" systems are last moment systems operating right at the edge of destruction. They destroy the inbound weapon within a few inches of an impact. An example of this is the self-titled Iron Curtain system. It detects and tracks inbound weapons by radar and then employs the kill mechanism just before impact. The kill process is to fire an interceptor projectile from one of an array of single shot gun barrels mounted vertically around the roof line of the defended vehicle and pointing down along the vehicle's side.

There are U.S. patents for active protection systems: U.S. Pat. No. 7,202,809 Schade et al is a fly out system, and U.S. Pat. No. 7,954,411 Odhner et al is an "in extremis" system.

There are non-pyrotechnic active protection systems that interfere with an attacking missile's guidance. Called soft kill systems, one example is the Russian Shtora, which combines sensors, an electro-optical jammer, and smoke grenade launchers.

All of these systems are unable to deal with a large portion of the spectrum of threats presented earlier. No fielded APS offers assured protection against a single penetrator fired from a main tank gun; streaming high speed projectiles from direct fire heavy machine guns or automatic cannons; blast; fragmentation; flame weapons of any type; or the hypersonic, fluid, metal streams or liner residue from any of the three shaped charge weapons once the warheads have been detonated. Since they cannot defend against blast and fragments or against hemispherical and EFP shaped charges, none of the fielded shoot down systems has defensive capability against IEDs.

Furthermore, counter measures are being actively pursued to reduce the effectiveness that does exist. A shoot down defense system has to successfully do at least six separate difficult tasks including detect the launch; track the missile or RPG; compute the trajectory; select a defensive weapon to fire; bring it online; and launch it at exactly the right time. Additionally for blast-fragmentation warheads the warhead must be triggered at exactly the right time. These steps have to be done within a specific time line called the reaction time or cycle time. Furthermore the steps all have to be repeated within a certain time for successive shots at different targets or for another shot at the first target. The delay is preparing for successive engagements is the system recycle time.

Every one of these steps constitutes a single point of catastrophic failure. Each task has a discrete probability of failure, and a failure to perform in any of these tasks flawlessly and within the time constraints has a high probability of being fatal. In fact the recycle rate between engagements is the characteristic weakness that the Russian RPG-30 advanced RPG has been designed to exploit: the kill weapon will be too close behind the decoy to allow the defense a second shot.

Furthermore, even if everything works properly the pyrotechnical or KE kill mechanisms of the defense system itself may decimate friendly troops or innocents nearby. Additionally there are severe regulatory controls. All pyrotechnical military systems are wrapped in extraordinary controls on the handling, export, and re-import of original equipment, spare parts, training, and maintenance materials. Everything connected with all their subsystems and accessories are subject to regulations from the State Department; the Bureau of Alcohol, Tobacco, and Firearms; and potentially others.

In U.S. Pat. No. 5,576,508 (1996) Korpi describes a system that transports armor plates and also provides a mechanical apparatus to deploy them prior to entering the engagement. Specifically the stored armor plates are rolled outward away from the vehicle body on carriers at the time of tactical operations. This allows for better overall mobility while still allowing the emplacement of armor at a large number of charge diameters from the target for the purpose of causing suboptimal detonation of shaped charge warheads. The problem with this is that the mass and bulkiness of the system will generate issues in tactical reliability and support, especially in adverse terrain and weather. These problems will be exacerbated by trying to build a system for relatively light vehicles with enough mass or enough standoff between the plates and the target to defeat modern weapons.

The Development Process and the State of the Art in the Subsystems

Engineering development follows fairly standard procedures across industries. For this system, a weapon system, the best model is the U.S. Department of Defense system for material development.

Formal configuration management begins with the requirements and proceeds through three formal baselines that succeed each other in time and in the depth of detail encompassed. The process is depicted in FIG. 2. The Functional Baseline is established when the requirements analysis defines the "what," "when," "how well," and the details. It is captured in an approved System Specification, and it is sometimes called the functional architecture. Next developed is the physical architecture, which is the separate configuration items (CI) and support items that will constitute the solution system. They form the second baseline, the Allocated Baseline, and the new specification is actually the collection of Item Specifications for each of the separate CIs. At this point the CI specifications are not detailed enough to support parts procurement and manufacture. Those are developed next to support procurement, fabrication and test. The last of the three baselines is created. It is the Product Baseline, which is captured in the Product Specification, the Process Specification, and the Material Specification to create the product's manufacturing data package or MDP. The integrated logistics support package is developed in parallel to contain all the technical documents, training programs, test equipment, and other items needed to deploy and support the system.

The systems engineering management schedules follow an event-driven format. Named technical reviews and audits include the Alternate Systems Review (ASR), the System Requirements Review (SRR), the Preliminary Design Review (PDR), the Critical Design Review (CDR), the Test Readiness Review (TRR), the Functional Configuration Audit (FCA), and the Physical Configuration Audit (PCA). At the end of every phase a Requirements Review is conducted to update the Requirement if necessary. Milestone Decision Authority Reviews are held at the end of each phase to support one of three recommendations: continue into the next phase, stay in the current phase for more work, or terminate the program. Monthly Program Reviews between the contractor and the Government PM are the norm. Named management plans help ensure that nothing is overlooked. The Systems Engineering Master Plan (SEMP) is produced by the contractor. The Test and Evaluation Master Plan is prepared by the acquiring PMO in conjunction with the Test and Evaluation Command, which is extremely independent by charter and by historic precedent. The Integrated Logistic Support Plans, or ILSP, are multifaceted and all encompassing.

The U.S. Department of Defense, or DoD, uses a five step systems engineering method for all new systems. FIGS. 3 and 4 show the relationships of the first four steps of the DoD systems design process and some of the key tools.

1. Analyze the Requirements
2. Perform functional analysis of the processed Requirements
3. Allocate the functions to like groups
4. Synthesize a system that carries out the functions
5. Verify the system can do what has been projected.

The Requirements Analysis produces the Operational View, the Functional View, and the Physical View. Block diagrams show what the parts of a system are, what items sit upon or within what other items, and what the interfaces between them are. Interfaces can include physical interfaces and electrical, fluid, signals, thermal, and other flows. Specific tools include Functional Flow Block Diagrams (FFBD) at multiple levels of detail, time line sheets (TLS), and performance budgets such as the weight budget, the thermal budget, and the electrical power budget. Traceability of requirements is enabled by the numbering system. Every time a specific requirement is broken down each of the newly identified sub-requirements is numbered with the same number as the parent except that a decimal and a sequential number are added. Related functions are grouped together into the Requirements Allocation Sheets (RAS).

The RASs are the pivot point. Using the RASs, FFBDs, and TLSs the designers create design documents like schematic block diagrams (SBD or simply schematics), Concept Design Sheets (CDS), and Design Sheets (DS). They build the physical architecture which includes both the devices and their interfaces. The configuration item (CI) numbers are tentatively written on the RASs next to each and every function each CI will perform. Trade studies lead to iterations. Iteration loops include the Requirements Loop and the Design Loop. These are clearly labeled in FIG. 3.

The formal basis for contracting development is the work breakdown structure (WBS). The WBS captures the most basic issues of the triple constraint: what are we here to do, what are the conditions, and to what standards? It depicts the scope of work including all conditions and performance standards in tabular and graphical form. It allows organization of the work as the assembly and integration of lower level assemblies. The item by itself at the top of the WBS is the system as a whole. The very lowest level is where piece parts and structures are assembled and integrated into functional devices. At the second tier the prime item is on a level with all the separate categories of logistics development, program management, and system engineering.

The WBS depicted in FIGS. 5a, 5b, and 5c is the enterprise template for all DoD surface vehicles from U.S. Military Handbook 881A. For a specific system this template would be tailored as necessary to accurately depict the specific solution selected. Completion of the WBS allows the development of the schedule and the budget. FIG. 6 depicts an extremely simplified, nominal master schedule consisting of a milestone chart atop a Gantt chart, both using the same time line. When a given schedule is resourced the cost can be estimated. Scope, schedule, and budget can be traded for each other, but none can be increased or reduced by itself. Once the program is approved and launched it can be managed with a work authorization system that limits the approved charges to open tasks and with the various methods of supervision.

Objects and Advantages

Accordingly, besides alleviating the shortcomings of the prior art, several objects and advantages of the present invention are:

(a) to provide a stout physical barrier on a separate, unmanned, self-propelled, remotely controlled, expendable vehicle for defense against the weapons listed and effective to the specific design limitations;

(b) to not require the involvement of anyone at the engagement site other than the commander who coordinates in real time with the system controllers;

(c) pending specific implementations, to not use pyrotechnics or dangerous materials and to pose little or no threat to anyone near the vehicle nor to the environment;

(d) pending specific implementations and once in position, to be entirely passive and automatic with zero cycle time to full effectiveness.

BRIEF SUMMARY OF THE INVENTION

In accordance with the present invention the system comprises the integration of protective armor barrier systems on self propelled platforms operated using remote control. These protective vehicles are separate from the defended targets and able to be remotely or autonomously driven or both. The armor systems are comprised of one or more sheets of armor in a generally vertical presentation plus other complementary systems as preconfigured or as provided for with space and other interface provisions on the platforms. The robotic defilade vehicles may be parked in specific locations and then moved. Alternately they can be placed in specific positions in formation with moving vehicles to be protected and kept there or repositioned as needed while the convoy continues unstopping. The survival of the robotic defilade vehicles is of much lower priority than that of the defended vehicles, people, and structures, and they can be used as sacrificial devices if necessary. A phrase that characterizes the system well is "guided proxy targets."

BRIEF DESCRIPTION OF THE DRAWINGS

FIGS. 5a, 5b, and 5c show the Summary Work Breakdown Structure. (Prior Art)

FIGS. 8a, 8b, and 8c provide three views of the nominal production configuration.

FIG. 12 is the weight budget for the configuration items in the vehicle body armor.

FIG. 13 is a tabulation of the payload capabilities.

DRAWINGS

Reference Numerals

Figure 1C:
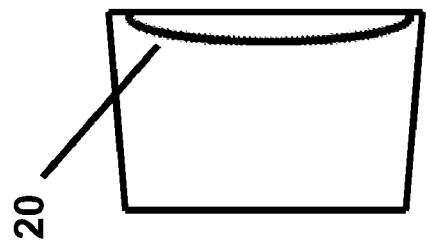
FIGS. 1a, 1b, and 1c show the three types of shaped charge warheads. (Prior Art)
Figure 1B:
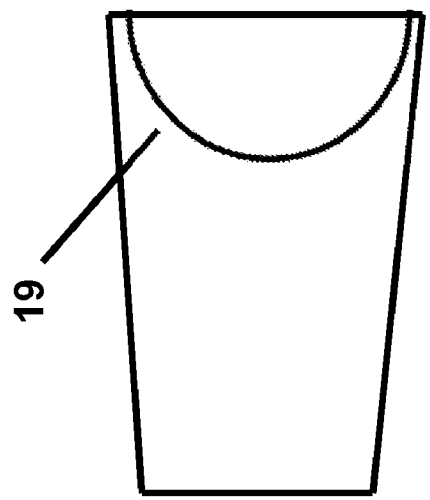
Figure 1A:
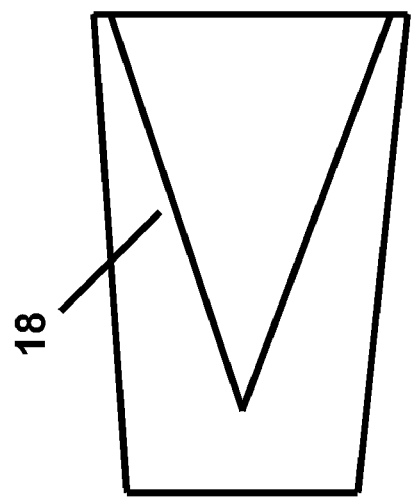
Figure 2:
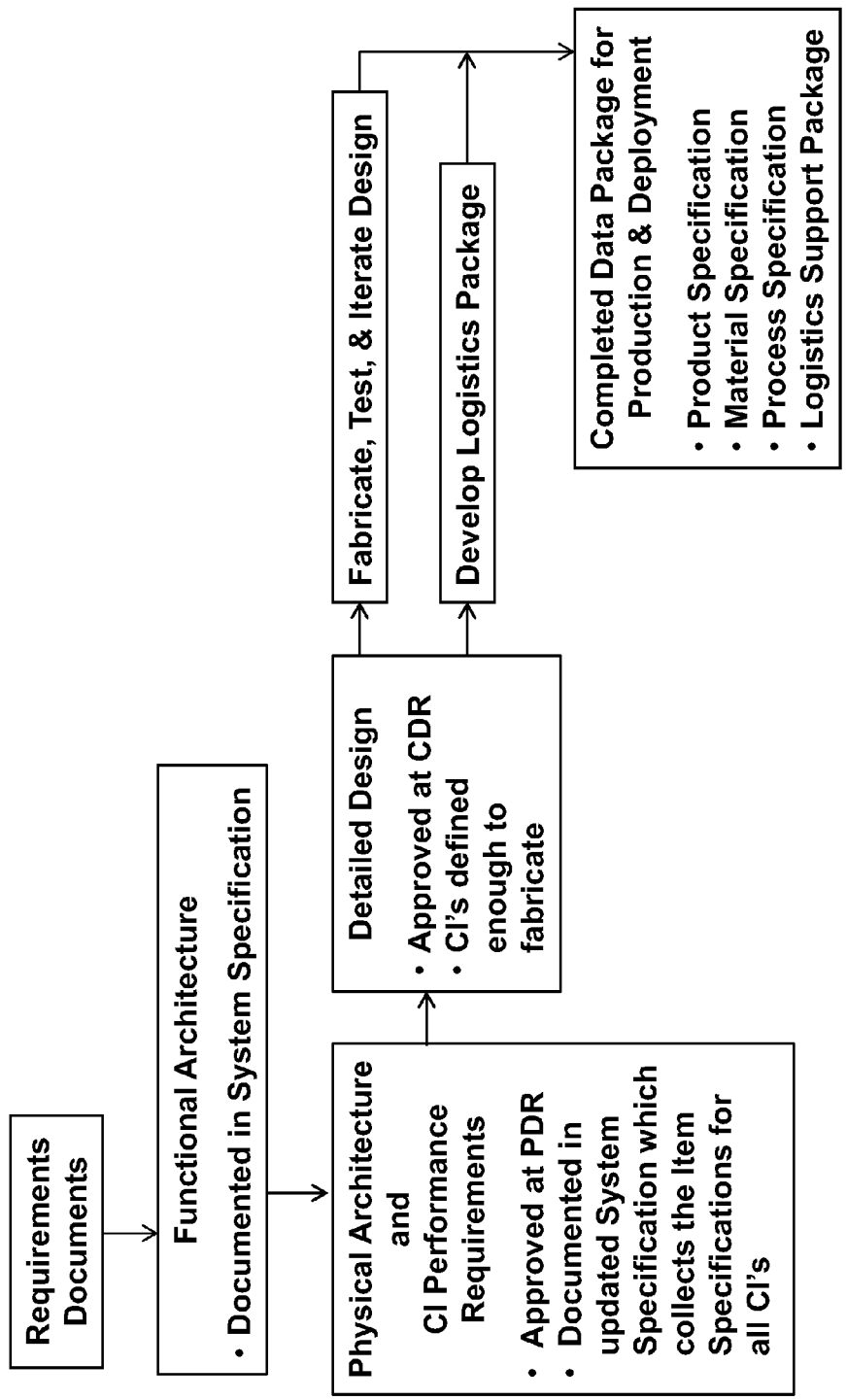
FIG. 2 is a flow chart of the standard development process.
Figure 3:
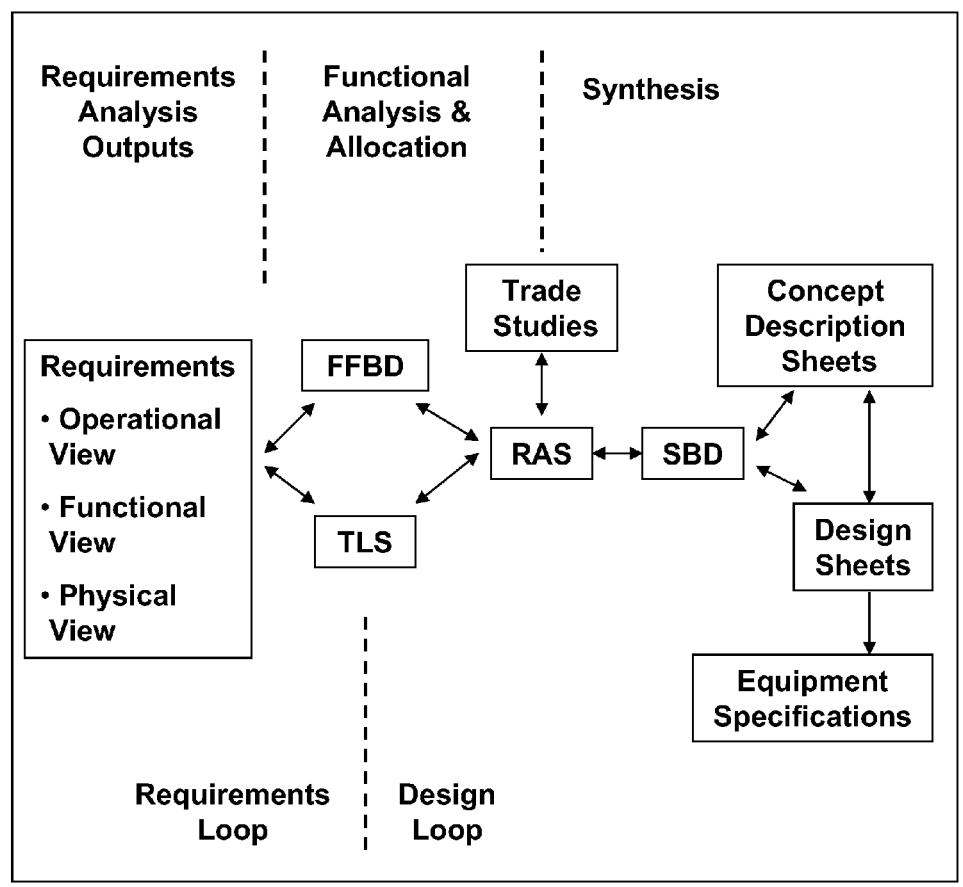
FIG. 3 shows the first steps of the U.S. equipment development process. (Prior Art)
Figure 4:
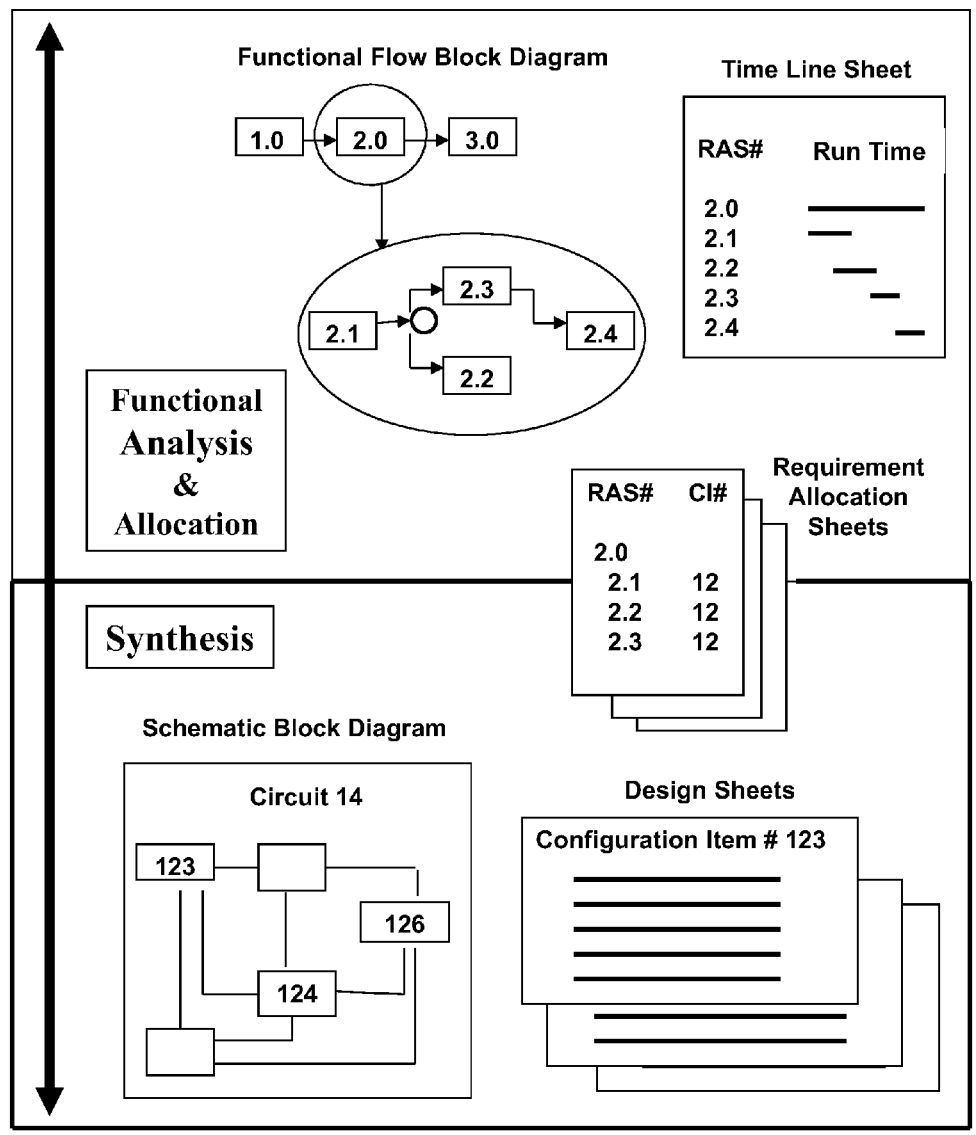
FIG. 4 shows some of the important analytical and design tools. (Prior Art)
Figure 6:
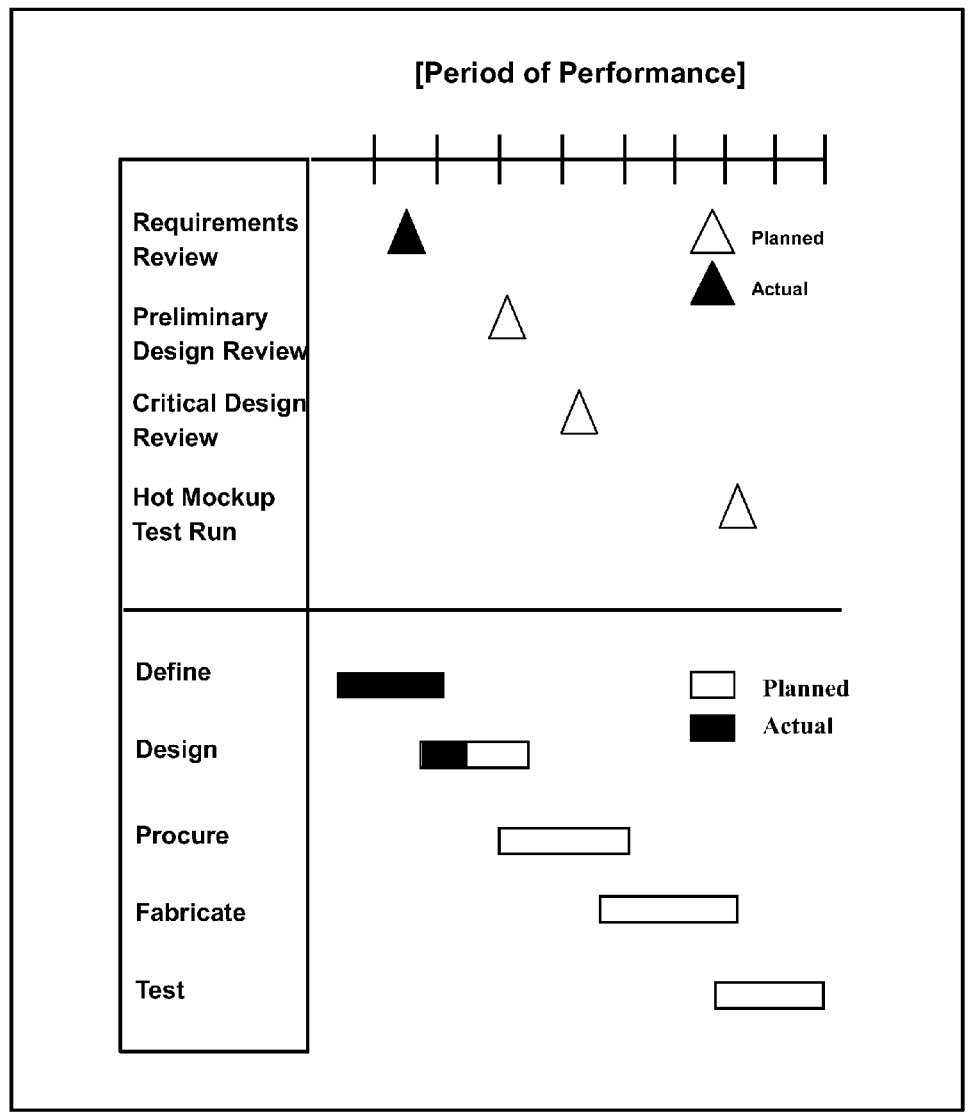
FIG. 6 is a simplified development program master schedule. (Prior Art)

FIGS. 15 through 22 depict three different tactical scenarios. Between views of the same general scenario the numbers have been repeated for the vehicles to which they pertain. Between different scenarios new numbers have been assigned to reflect the likelihood that the configurations will differ in some way.

| | |
|---|---|
| 18 | Metal liner for acutely conical liner shaped charge warhead |
| 19 | Metal liner for hemispherical liner shaped charge warhead |
| 20 | Metal liner for explosively forged penetrator shaped charge warhead |
| 22 | Flat bed, self propelled transport platform |
| 24 | Armor sheet emplaced as a wall |
| 26 | Lateral supports |
| 28 | Stability weight |
| 30a, b | Cameras covering each end of the vehicle |
| 32 | Run flat tires |
| 34 | Ballistically hardened wheels |
| 36 | Protective enclosure for vehicle control system |
| 38 | Redundant antennas for the control system external links |
| 40 | Front view of nominal production configuration |
| 42 | Side view of nominal production configuration |
| 44 | Top view of nominal production configuration |
| 45 | Delivered basic truck platform with automotive capabilities |
| 46 | Pickup truck ladder frame |
| 48 | Radiator and cooling system |
| 50 | Engine |
| 52 | Transmission |
| 54 | Military ballistically hardened wheel and run-flat tire assemblies |
| 56 | Drive shaft |
| 58 | Differential |
| 60a-d | Axles |
| 62 | Command and control system |
| 70 | Front end armor assembly |
| 72 | Front plate |
| 74a, b | Wing plates |
| 76a, b | Front side plates |
| 78 | Front top plate |
| 80 | Front assembly rear plate |
| 82 | Cooling system feed assembly |
| 84 | Headlights |
| 86 | Multi spectrum visual and infrared camera |
| 90 | Transmission armor assembly |
| 92 | Top plate |
| 94 | Transmission side armor plate |
| 100 | Vertical barrier assembly |
| 102 | Vertical armor plate |
| 104a, b | Forward lateral braces |
| 106a, b | Aft lateral braces |
| 108a, b | Lateral mounting cross beams |
| 110 | Beam-to-frame spacer |
| 120 | Rear wheel armor assemblies |
| 122a, b | Rear wheel armor top plates |
| 124a, b | Front armor plates |
| 126a, b | Outside side armor plates |
| 127a, b | Inside side armor plates |
| 128a, b | Rear armor plates |
| 140 | Lateral underside keepout armor plate |
| 150 | Vehicle platform in functional block diagram |
| 152 | Protective armored enclosure for communications, control, and other systems |
| 154 | External communications system |
| 156 | Vehicle interface and control system |
| 158 | Wire bundle |

| | |
|---|---|
| 160a, b | Dual communications antennas |
| 162 | Wire harness |
| 164 | Wire harness for electrical power |
| 166 | Vehicle's electrical power system |
| 168 | Wire harness to seven servos |
| 170a-g | Seven servos |
| 172a-g | Seven vehicle subsystems |
| 174 | Wire harness for cameras |
| 176a, b | Cameras |
| 180 | Patrol leader's vehicle |
| 182a, b | Robotic defilade vehicles |
| 184 | Debris pile |
| 186 | Parked car |
| 188 | Operator for the robotic defilade vehicles |
| 190 | Stone wall around military base |
| 192 | Large antenna |
| 194 | Unmanned aerial vehicle with radio relay capabilities |
| 196 | Radio transmissions between the operator and the patrol elements |
| 198 | Patrol scenario 1 |
| 200 | Patrol scenario 2 |
| 202 | Patrol scenario 3 |
| 210a, b | Manned vehicles |
| 212a-d | Robotic defilade vehicles |
| 214 | Street where attack will run |
| 216 | Building where the raid will be conducted |
| 218 | Sidewalk |
| 220a, b | Parked cars |
| 222 | Debris pile |
| 232a, b | Manned patrol vehicles |
| 234a-d | Unmanned robotic defilade vehicles |
| 236a-c | Vehicles parked at curb |
| 238 | Pile of debris |
| 240 | Vector for initial penetrating capabilities of EFP |
| 242a, b | Vectors for residual debris of EFP |
| 250a, b | Dual sheets of armor functioning as walls |
| 252 | Screen used to exclude hand grenades and other objects |

DETAILED DESCRIPTION OF THE INVENTION

In accordance with the present invention the system comprises a plurality of features to remotely control and maneuver vehicles transporting erect and braced armor barriers between the defended targets and suspected threat positions and to relocate them as necessary throughout the conduct of the mission. This includes the ability to have these remote systems travel alongside the defended vehicles or in positions advantageous to the defense at varying speeds. Within the system the only major variability with cascading effects is in the size and weight of the armor required to defeat the different threats and the size of the truck platform to support that wall. Command and control systems of all types are expected to be readily accommodated. The other parts are unchanged from armor carrier to armor carrier except for limited increases in size of the defensive armor and fitments to accommodate the larger vehicles. These dimensional changes are much less than proportionate to the increases in the vehicles' payloads.

1. Develop the System Requirements, especially the missions encompassed, the targets to be defended, and the criteria for success; the threat weapons and tactics to be defeated; the human interface and operational requirements; the command and control requirements; the environmental requirements; and the support requirements. For the relay subsystems utilize existing systems as much as possible, including especially the multitude of unmanned aerial vehicles, or UAV's, already in service. To actually gain their use these systems may need a limited adaptation for the relay role. Also the deployment of the robotic defilade system may require additional UAV's to be purchased and deployed with them to accommodate the new or expanded mission.

2. Select a barrier wall material, size, and thickness according to the mission and threat Requirements.

3. From a table of the payload capabilities of the different trucks being considered select a model that can mount the barrier wall, all its fittings and supports, the protective armor for the carrier vehicle, and the command and control and any other subsystems incorporated into the system. Normally trucks sold for really heavy duty work are advertised in their chassis cab configurations. The chassis cab configuration is the vehicle ladder frame plus the automotive components such as the drive train and the suspension plus the cab and the front exterior components. The aft frame area is left bare so the buyer can specify exactly what enclosure or load platform he wants to mount on the aft frame rails. The vehicles to be acquired for the robotic defilade system will have even fewer components on them than the chassis cab level. That is because none of the elements of the standard civilian shell will provide adequate armor protection for the vehicle's own survivability. Adequate consideration to cooling and other reliability and support issues may be handled by imposing an excess payload margin on the criteria. When the carrier vehicle is to be an adaptation of an existing truck the selected vehicle will immediately become part of the configuration. When the design will be a custom design the truck selected will help form the basis for the subsystems' design and the weight budgets.

4. Select the command and control approach and the specific mechanization. When the make or buy decision preparation commences there will be an enormous variety of sources and a great range of suppliers.

5. Create the Preliminary Design. This identifies the identity of the separate parts.

6. Analyze the performance and weight budget trade offs, and iterate the design as necessary. Use modeling and testing as necessary.

7. Based on the findings in 6 above, create the Detailed Design. This is the nominal production configuration, subject to testing.

8. Fabricate test articles, conduct tests, and make adjustments as necessary to create the Production Data Package.

The development process for the self-transporting wall assembly will be entirely deterministic. The state of the art for the armored payload structure and the carrier vehicle is so mature that there are no technical risks. Remote control of ground, water, and airborne vehicles currently has over five decades of formal development for military, space, and hobby uses. The fundamental components are control switches at the operator station, operator display systems, transmitters, receivers, power supplies, logic units, and electrical, electro-mechanical, and electro-pneumatic actuators. These have been proven in thousands of predecessor systems including hundreds of models of remotely controlled car, airplane, and ship models. These collectively are known as RC models. The component parts have also been proven in dozens of military UAV systems; thousands of torpedoes and guided missiles, especially the command guided ones; and in the many space systems that fly through space or traverse alien worlds as servos to earth-bound control systems. The sophistication of the subsystems for even consumer market, remotely controlled models is surprising. The TRAXXAS T-Maxx, an off-road RC car model slightly less than 22 inches long and easily carried by hand, for example, has remotely operated throttle, steering, and four wheel braking; a suspension system with eight shock absorbers; and a four wheel drive automatic transmission with a reverse gear. Many RC vehicle manufacturers sell technical manuals with blow up diagrams of transmissions and other complex assemblies over the Internet. System design for anyone skilled in the arts is like catalog shopping. Relay systems to support remote controlling are also extremely well developed. Other than for locally-controlled takeoffs and landings the Predators flown in Afghanistan are controlled from Nevada.

Figure 7:
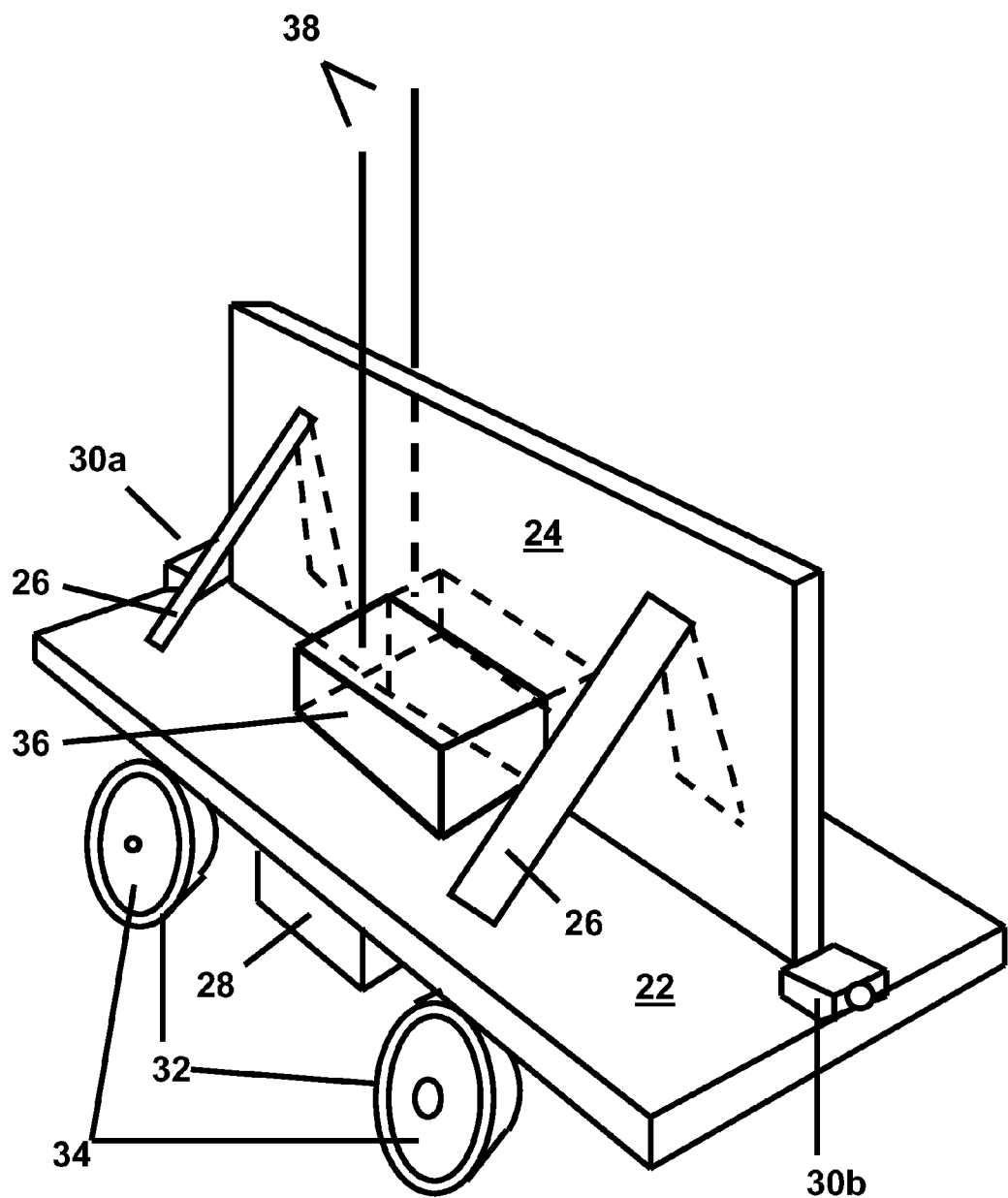
FIG. 7 depicts the nominal functional configuration of the robotic defilade vehicle.

FIG. 7 illustrates the nominal functional configuration. The baseline is for protection of the HMMWV. The transport platform 22 is a self-propelled, flat bed transporter similar in appearance to the Marine Corps' mule vehicle configured with a wall of steel armor 24 vertically mounted and suitably braced by rigid supports 26. The wall is five feet tall, seven feet long, and one inch thick, and it weighs approximately 1,435 pounds. The height of the load floor of the carrier vehicle is equal to the height of the interior floor in the passenger compartment of a HMMWV. This latter dimension defines the lowest edge of the protected area. Stability weights to help control the tipping moment of the wall are installed on the underside of the platform toward the lateral edges and are visible in the illustration for the near side at 28. The vehicle has television cameras 30a and 30b operating in the visual spectrum, the infrared spectrum, or both. These are positioned on the front and back ends to allow the remote operator at least be able to drive the vehicle forward and backward, including inserting it into parking places between other vehicles. A camera mounting implementation that allows the operator to see in all directions as could an onboard driver would be highly desirable. The vehicle has an engine, transmission, steering, braking, and all other standard automotive systems. All automotive systems are mounted under the bed. The automotive systems are shielded by armor. The tires 32 are of run flat design, and the wheels 34 are hardened for ballistic survivability.

The vehicle features a control system located within an armored enclosure 36 and capable of driving the vehicle in response to external commands or autonomously. A redundant antenna system 38 is provided for the external links. The fixing of the different parts to the transport bed and to each other may be done by brackets, welding, or other means well understood by those skilled in the art of mechanical and electrical assembly.

Developing a Preliminary Production Design—the Barrier Wall

The defeat of all the weapons identified can be enhanced by triggering the detonation of the warhead as early as possible or by intercepting the fluid metal or projectile as far from the target as possible. This can be done tactically by externally or autonomously guided, self-propelled platforms that mount an erect wall of armor and can be driven to positions between the targets and the likely ambush weapon's positions. The first effect of the barrier is to degrade the opportunity for the shooter to get an unobstructed view prior to firing. This will make it harder for him or her to select as their aim point an area of known weakness. The second is to absorb enough destructive power in a sacrificial proxy target for the real target's defensive structure to defeat any residual destructive elements. The parametric trades that govern are the effective mass and weight of the barrier versus the power of the attacking weapon. The number of charge diameters from the barrier to the true target will also be significant for some weapons. Each of the main factors is constrained by military logistics and tactics. The objective is to create a relationship between the barrier and the threat weapons where the following are true.

Acute Conical and Hemispherical Liner Products. The stout intermediate barrier will force an acute conical or hemispherical liner warhead on a missile to detonate earlier than planned, making the remaining distance to the target more likely to be unfavorable to the attacker due to excessive standoff. For both warhead design types the portion of the jet below the critical speed will experience truncation. The slug formed by the acutely conical liner weapon will be arrested. As a result of high expenditures of mass and energy in the erosion through the barrier and in the creation of all the side effects, the residual jet of the acutely conical liner weapon or the blended jet-slug mass of the hemispherical liner weapon will have relatively low power as it exits the barrier.

EFP Dart and KE Projectile. The barrier will bleed off critical amounts of the destructive energy, either stopping the mass completely or reducing the power in the residual to levels within the capabilities of the target's own armor.

Fire Weapons. The flaming material will be deployed entirely against the barrier, and its effects will not reach the real target.

There is a high probability that heavy weapons impacting the barrier will create spall in the immediate area on the back side of the wall. It may be desirable to affix spall liners or other spall restraint devices to both sides of the wall to control that debris.

Given the variety of weapons and their different kill mechanisms, it is difficult to identify a single parameter that will ensure they all are neutralized. Where IED's are a significant threat, however, it may be useful to base the solution on the largest explosively formed projectile likely to be encountered. It would be useful to calculate the size of the largest explosively forged penetrator dart such a device could create if it had been built under precision manufacturing conditions. Then plan to defeat that dart. That is because explosively forged penetrator darts have higher penetration capabilities than most battlefield KE weapons and the fragments of omni-directional blast and fragmentation weapons. Moreover, since most IED's are not manufactured under precision conditions, their actual performance will normally be considerably less than the high precision weapon dart used to select the barrier. That means that planning for the precision dart provides margin against the less powerful weapon that is more likely to be encountered.

To deal with the weapons that may have more hard armor penetration capabilities than the explosively forged penetrator, that is to say hemispherical and acute angle liner weapons of the same diameter, the loss of performance in those weapons when they have been imprecisely manufactured is also severe. Thus, designing to defeat a precision manufactured dart of a particular diameter may be enough to totally defeat a jet creating weapon of the same diameter but which was imprecisely manufactured. Further, if they do penetrate the barrier, the mass and power of their residual penetration debris will be greatly reduced. This residual will also be less likely to travel a large number of charge diameters to the real target without experiencing enough degradation due to jet breakup and spreading to make the debris more susceptible to the point defenses of that target.

As previously noted, Chi graphs modeling and experimental results for 6.35 cm steel EFPs penetrating steel plates in FIGS. 12 and 13 of *TMW* on pages 481 and 482. For initial speeds up to 3 km/sec the penetration ceases within a depth slightly less than the length of the dart. If that is representative of the threat addressed, this gives us a standard from which to construct a test model for evaluation versus the threat weapons within the Requirement. Based on the length and height of the barrier needed to screen the vehicle that we have taken as representative of the mission, this also allows us the ability to calculate the weight of the barrier and then to select from amongst the various trucks for one with adequate payload. This is the point where the design of the robotic defilade vehicle for front line, heavy infantry combat diverges from that for an urban police force asset.

Developing a Preliminary Production Design—the Carrier Vehicle

FIGS. 8*a*, 8*b*, and 8*c* are front 40, side 42, and top side 44 views of a nominal production configuration assembly. This configuration differs from the functional configuration in that it will do the job much less expensively than a custom designed machine. The nominal production configuration is based on conversion of a standard heavy duty pickup truck in a configuration even more stripped down than is the chassis cab. Everything not directly related to making the vehicle move, turn, brake, back up, or perform other over the road tasks will be absent when it is delivered. In fact, since it will have neither the cab nor the controls that would be in the cab, the vehicles will either have to be towed or carried from the assembly point to all subsequent stops in production up to the time of build up into the robotic vehicle. Alternately a remote control device could be developed.

The vertical barrier is four feet tall. The vertical barrier assembly sits upon the lowest stretch of the aft ladder frame. This is several inches below the height where the truck box normally sits due to the up curvature of the frame aft of the front wheels and forward of the back wheels. The height from the lower edge of the truck frame rail to the top edge is about seven inches. If the cross members supporting the wall do not protrude above the rail, the lower edge of the vertical wall is approximately twenty seven (27) inches above the ground, and the combined height of the rail and the wall assembly is 6 feet, 10 inches. The bottom edge of the main armor plate is about a foot above the floor of the HMMWV passenger compartment. All this together means that the barrier itself does not have to be as tall as it would be otherwise, a weight savings. The frame of the truck, however, needs for extra armor to be attached to it to protect the lower part of the HMMWV protected envelope, which is below the lower edge of the main vertical armor plate. With the protection offered by the vehicle body armor and engine block the total length of protection stretching from the front of the engine to the aft end of the barrier is about 11 feet, or 50% longer than the required HMMWV protected area.

The dual antennas for the command and control system will be affixed to the wall on either side in a way that provides optimal survivability for the linkage and redundancy.

Figure 9B:
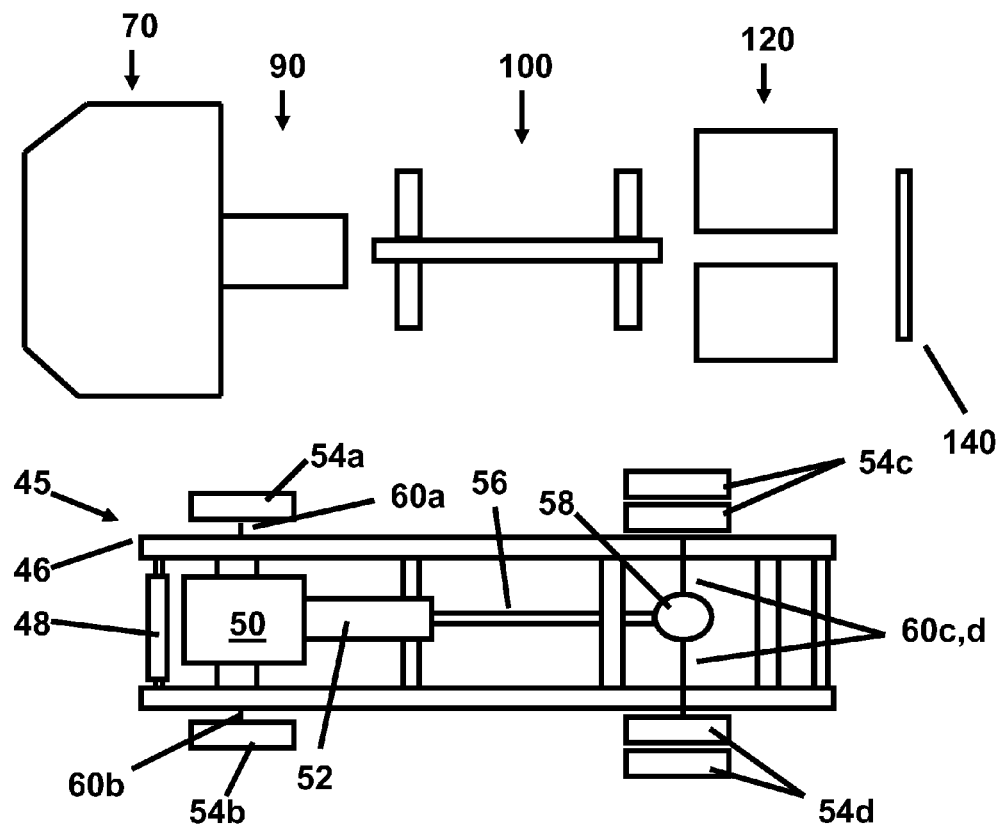
FIGS. 9a, 9b, and 9c show top view depictions of the nominal production configuration.
Figure 9A:
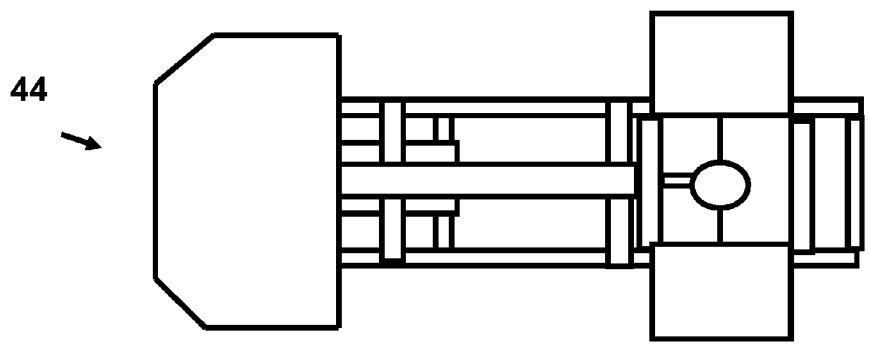
Figure 9C:
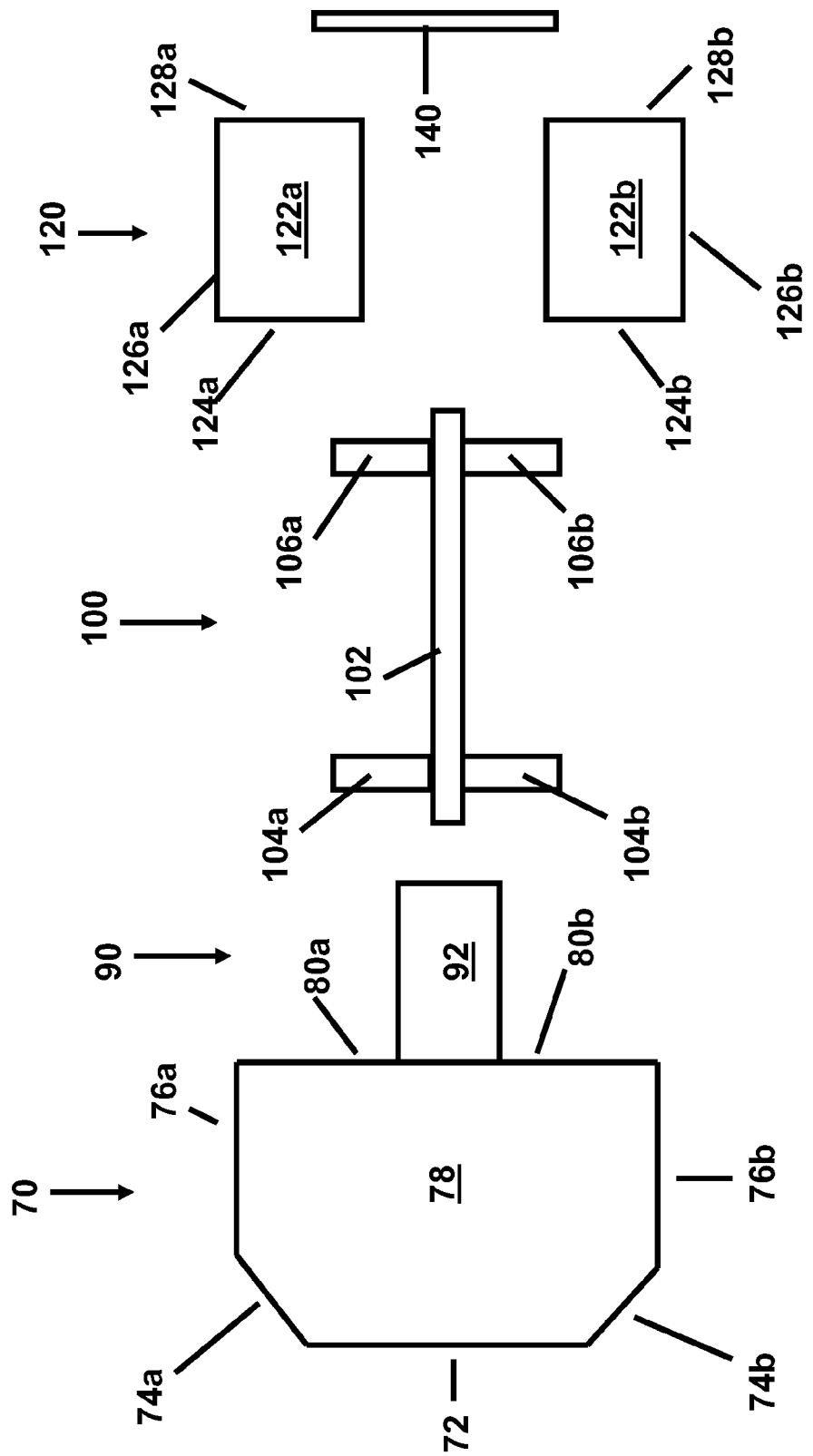

FIGS. 9*a*, 9*b*, and 9*c* offer on two sheets a more detailed depiction of the top view. In FIG. 9*a* is the top view assembly 44. In FIG. 9*b* is the delivered basic truck platform with automotive capabilities 45, and above it appear the assemblies of the kit. Pickup truck components include the ladder frame 46; radiator and cooling assembly 48; engine 50; transmission 52; and the wheel and tire assemblies 54 *a-d*. The wheel and tire assemblies that came with the truck have been swapped for military assemblies, run-flat tires mounted on ballistically hardened wheels. The drive shaft is 56; the differential 58; and the axles 60 *a-d*. At the top in FIG. 9*b* the assemblies are shown, and in FIG. 9*c* on the next sheet the parts that comprise those assemblies are depicted. The assemblies are the front end armor assembly 70, the transmission armor assembly 90, the vertical barrier assembly 100, the rear wheel armor assembly 120, and the lateral underside keepout armor plate 140.

On sheet 12/26 the front end armor assembly 70 comprises the front plate 72; the wing plates 74 *a,b*; the front side plates 76 *a,b*; the front top plate 78; and the front assembly rear plates 80*a,b*. The transmission assembly 90 comprises the top plate 92. The vertical barrier assembly 100 comprises the vertical armor plate 102; the forward lateral braces 104*a,b*; and the aft lateral braces 106*a,b*. The rear wheel armor assemblies 120 comprise the rear wheel armor top plates 122*a,b*; front plates 124*a,b*; side plates 126*a,b*; and rear plates 128*a,b*. The lateral underside keepout armor plate is 140.

From the top view it is clear that most of the ladder frame is not physically covered but is open to the air. Some approach will be required to keep hand grenades and satchel charges from being lofted into the space below the vehicle. One approach is a very tight mesh of chain link fence fabric attached to the vertical barrier at the top of the fore and aft lateral braces 104*a,b* and 106*a,b* and anchored to the ladder frame. Also to be defined for specific designs is what in addition to the fixed armor explicitly identified will be used to protect the drive shaft and underside of the vehicle. The ladder frame itself may need to have additional steel attached to it in some places. This would help protect the transmission, drive shaft, and differential. Other options for protecting the underside revolve around object deflectors, armor, or a combination.

Figure 10B:
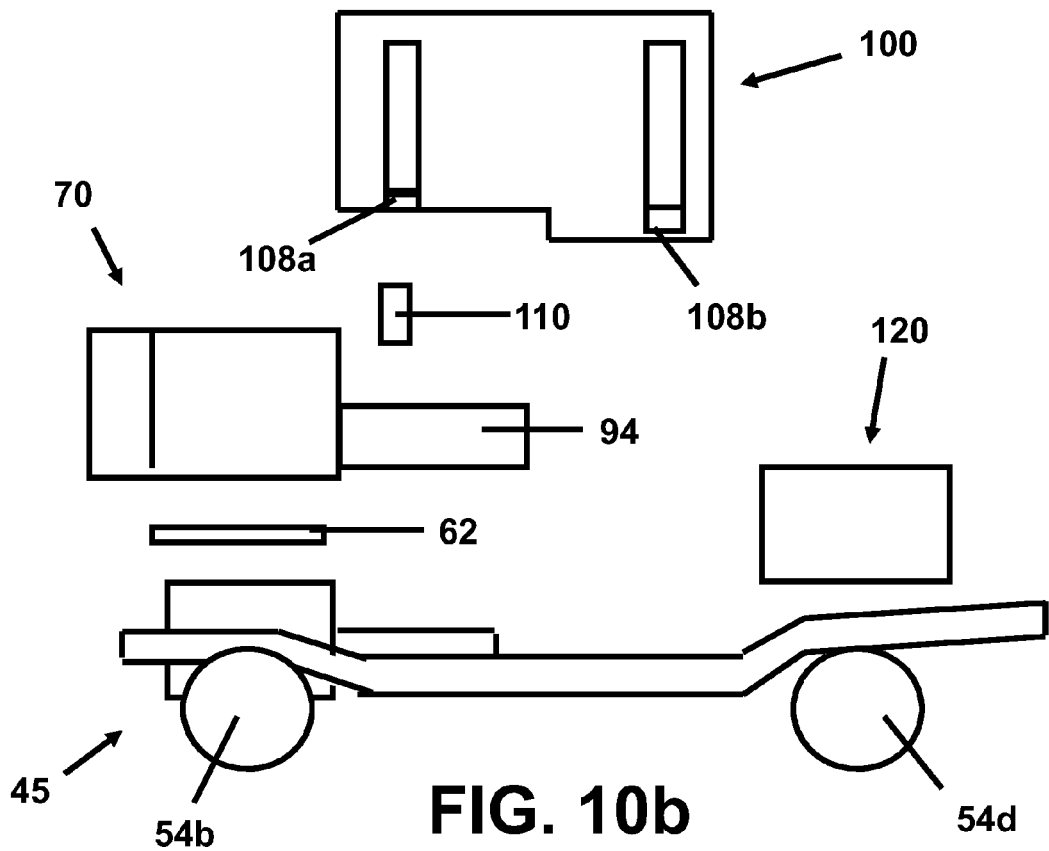
FIGS. 10a and 10b provide a side view of the nominal production configuration.
Figure 10A:
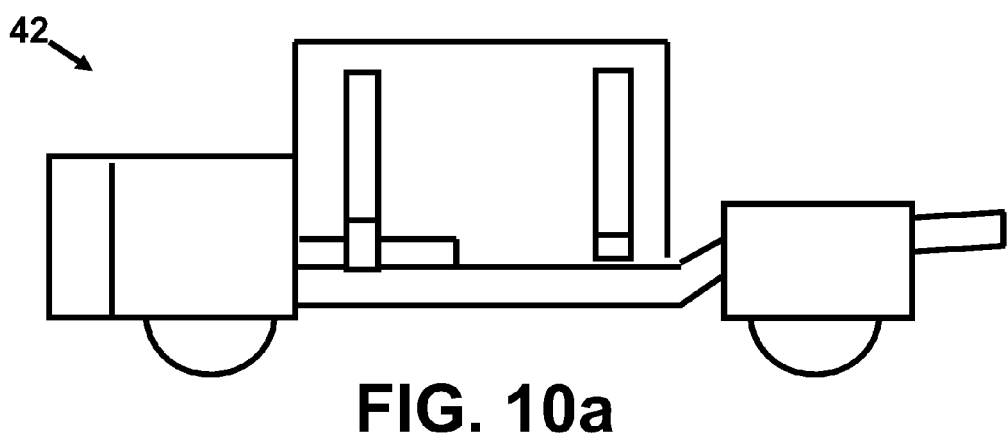

FIGS. 10*a* and 10*b* offer a more detailed depiction of the side view. In FIG. 10*a* is the side view assembly 42. In FIG. 10*b* is a stack up of the assemblies that might be fabricated to create parts for the conversion kit. Parts that were previously depicted are the basic truck platform 45, military wheel and tire assemblies 54*b* and 54*d*, the front armor assembly 70, the vertical armor assembly 100, and the rear wheel armor assemblies 120. Parts not previously shown are the command and control assembly 62, the transmission armor side panel 94, and three new parts of the vertical wall assembly. The command and control assembly is where the system processor, power supply, communications, and vehicle interface functions are carried out. It occupies a space within the engine compartment. It is designed to fit the available space without raising the height of the engine compartment. Clearly the final design for each model vehicle will be unique.

The new parts of the vertical armor assembly are items 108*a*, 108*b*, and item 110. Parts 108*a* and 108*b* are the frame spanning lateral mounting cross beams. Part 110 is the beam-to-frame spacer. There are two parts 110 on the vehicle, one atop the frame on either side of the transmission. Parts 108*a* and 108*b* are mounted athwart the frame to carry the weight of the wall. Part 108*b* mounts to the frame. Part 108*a* mounts to part 110 on either side of the transmission. These spacers are necessary because the transmission rises above the frame. To accommodate this profile the wall itself has a notch cut across the bottom, and the spacers accommodate the physical mating of the forward cross beam.

The lateral underside keepout armor plate is not depicted because it attaches to the inside edge of the lower part of the rear wheel armor assemblies, and in that position it is masked from the side.

Figures 11A, 11B:
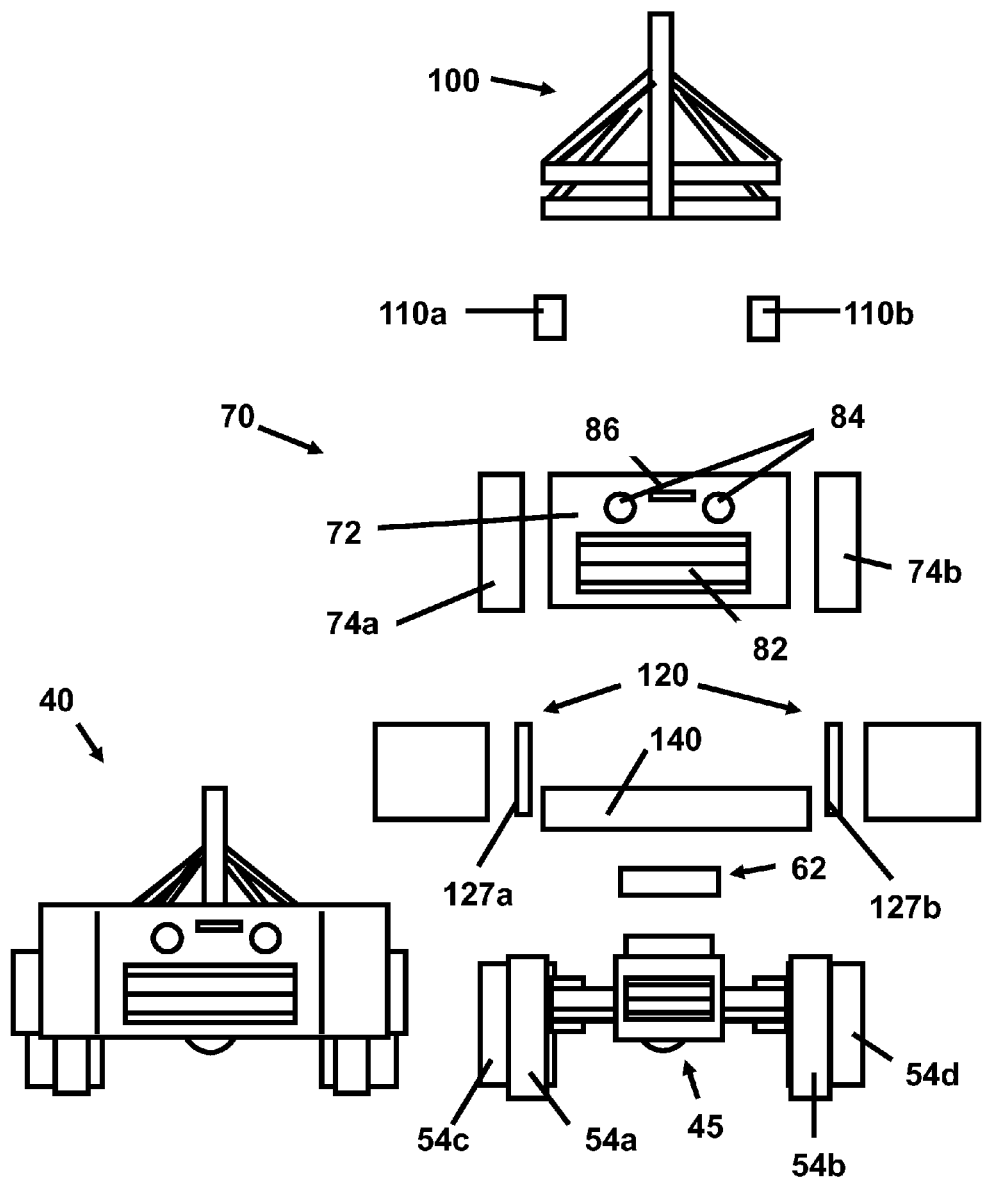
FIGS. 11a and 11b provide front views of the nominal production configuration.

FIGS. 11*a* and 11*b* offer a more detailed depiction of the front view. In FIG. 11*a* is the front view assembly 40. In FIG. 11*b* is a stack up of the assemblies that might be fabricated to create parts for the conversion kit. Parts that were previously depicted include the basic truck platform 45, military wheel and tire assemblies 54*a*-54*d*, the command and control assembly 62, the vertical armor assembly 100, the rear wheel armor assembly 120, the lateral underside keepout armor plate 140, and some of the parts of the front armor assembly 70. These include the front plate 72 and the wing plates 74*a* and 74*b*. New parts for the front end are the cooling system feed assembly 82, the headlights 84, and the front camera system 86. The cooling system feed assembly provides protection for the vehicle radiator while minimizing resistance to cooling air. The camera system is multi spectral visual and infrared. Parts 127*a,b* are the inside side armor plates of the rear wheel armor assemblies. With respect to the vertical armor system it is worth noting the positions into which parts 108*a*, 108*b*, and part 110 fit to support the vertical wall.

FIG. 12 tabulates for the two wheels per rear axle variant of the Ford F-350 the nominal dimensions and weights for the body armor assemblies and their constituent parts. These weights were estimated based on manual measurements for three of the vehicles in the Ford F-series lineup and rough drawings of the vehicles when covered with armor instead of the standard sheet metal. Panels have not been optimized and are intended primarily to illustrate applicable weight budgets.

No provision has been made for servicing the vehicle. A design for servicing will absolutely depend upon what vehicle is selected as the basis. The general strategy in the selection of vehicle protective armor for the nominal configuration is to force the enemy to use at least light machine guns rather than just assault rifles to penetrate the vertical, outward facing armor that protects the vehicle itself. Sacrificing a vehicle's mobility to discover the location of a machine gun is normally a very acceptable trade off, especially if the vehicle can probably be retrieved and repaired later. Armor materials other than steel may present a better overall systems solution to meeting this objective.

The actual dimensions, weights, and armor protection of the kit will depend upon the type of truck selected to carry it and vice versa. The Ford Motor Company publicly lists the characteristics for its different models. FIG. 13 shows sample calculations of what payloads different trucks could handle, given publicly available data and estimates for the rest. What is important is not the specific values but the process of comparing the weights of the kit components other than the barrier wall to the payload to find the available payload capability for carrying a barrier.

FIG. 13 tabulates the payload capabilities of several Ford trucks in their chassis cab configuration. It also lists the weights for the protective vehicle armor and an allowance for structure. The allowance for structure is the weight of the fixtures to secure the protective armor and the barrier armor, and it is estimated to be half the weight of the protective armor. The weight of the command and control system is considered negligible. The difference between the payload and the sum of the protective armor and the allowance for structure is the payload capability left over and available for the barrier wall itself. Therefore, based upon the need for a wall of a given thickness, it is possible to go into the table and pick the vehicles that should be able to accommodate that load. It is also possible to identify the nearest larger vehicles that might be worth considering in the event that additional payload is artificially injected into the Requirements to represent margin for extremely hot environments. For example, the 5 inch wall needed nominally to stop a 7 inch dart of the same material would require the payload of the F-550. The analysts might also want to look at the larger F-650 or F-750 as potentially better suited to carry the required load and have margin for high temperatures or steep terrain.

To protect a Stryker, which has a protected surface several times that of the HMMWV, would require one of the larger vehicles. An F-750 truck has a payload capacity of 24,433 pounds, so it may be adequate to meet this need. As previously noted, the Stryker needs less complementary off-vehicle armor than the HMMWV. Modification of a basic Stryker/LAV vehicle is another option. Such a vehicle would undoubtedly be more robust and agile, but its cost would be a multiple of that for the robotic defilade vehicle. The deciding factor may be the proportion of urban versus off road action envisioned.

Developing a Preliminary Production Design—the Command and Control System

Figure 14:
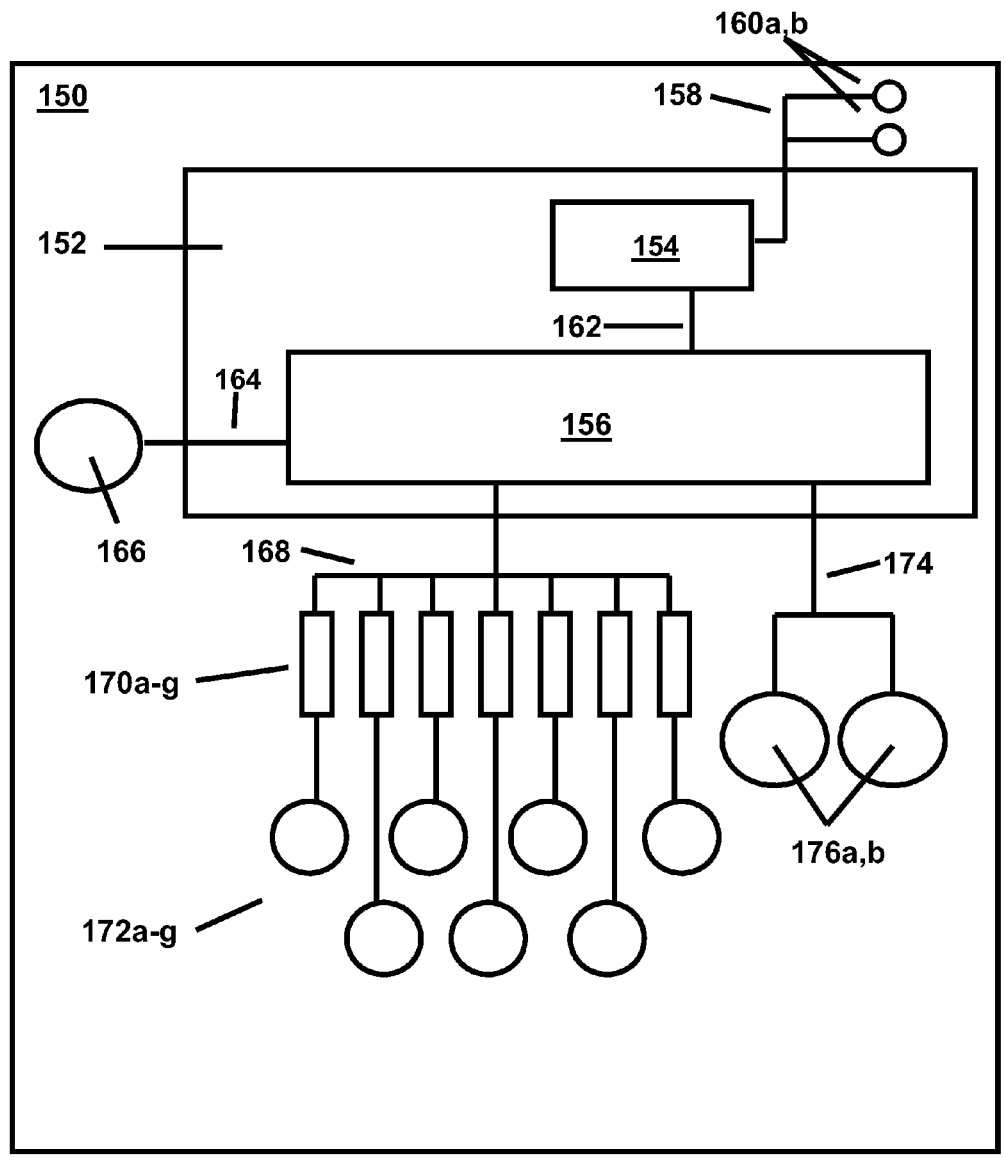
FIG. 14 is a block diagram of the communications and control subsystems.

FIG. 14 is a nominal block diagram for the interfacing of the control system and the vehicle subsystems. In the illustration the vehicle platform is 150. The armored external shell 152 encloses and protects the external communications system 154 and the vehicle interface and control system 156. The external communications system is connected by a wire harness 158 to the dual antennas 160*a,b*. The external communications system and the vehicle interface and control system are connected by a wire harness 162. Another wire harness 164 connects the vehicle interface and control system to the vehicle's electrical power system 166. Within the vehicle interface and control system is a precision power supply that converts the vehicle power to the various types of power needed for communications and control. The control system depicted has a wire harness 168 running from it to seven mechanical servos 170*a-g* for seven vehicle subsystems 172*a-g*. Five of the vehicle subsystems are the starting and electrical subsystem, the steering subsystem, the transmission control subsystem, the accelerator control subsystem, and the braking subsystem. The other subsystems may be smoke generators, lights, or defensive systems. It is not necessary to identify on this nominal diagram which servos and which subsystems represent particular functions. It will be necessary, however, to do so on actual developmental systems' diagrams. The cameras are integrated by wiring harness 174 and represented by 176*a,b*. This is a nominal command and control system for illustrative purposes and can be expanded as necessary.

The architecture of the control system with servos is very similar to control systems widely in use around the world by enthusiasts who operate remotely controlled model cars, boats, airplanes, and other remotely controlled models. As previously noted, these systems have been used by adults and children around the world for decades. It would actually be possible to tailor the control system for the robotic defilade system from selected models of these commercially available RC systems. Some RC systems in fact provide more capabilities than are required for the robotic defilade system. The TRAXXAS T-Maxx, an off-road RC car model less than 22 inches in length and easily hand-carried, for example, not only has remotely operated throttle, steering, and four wheel braking actuators, but a suspension system with eight shock absorbers and a four wheel drive transmission. This transmission has a reverse gear and a two speed, auto-shifter-controlled forward drive. The transmission is patented, U.S. Pat. No. 6,367,345. Many of the RC model manufacturers sell full sets of technical and support manuals over the Internet including exploded view diagrams for complex assemblies. They also provide customer support technical consultation.

The actual interfaces may be from electrical power to mechanical power by means of a mechanical servo driven by outputs of the control system as depicted in the figure. Alternatively they may be electrical to electrical, depending on the way the subsystems are implemented, or electrical to pneumatic. The subsystem mechanisms themselves may be implemented using mechanical, electrical, hydraulic, electro magnetic, or other implementations that are well understood by persons skilled in automotive, electrical, and other engineering disciplines. Depending upon the specific implementation, additional wires, cables, pressure sources, and other fixtures may be installed.

The primary control for vehicle operation is command guidance using radio links between the operator and the robotic defilade vehicle. For enhanced tactical integrity and safety the principal mode of operation is for control to be performed by a remotely located operator talking to the local tactical commander in real time. Control by a person within the commander's formation is also possible; it is less desirable because it means someone in the formation is unable to concentrate on driving a manned vehicle or operating a weapon. Local control may be necessary, though, in the event the controller becomes unable to operate the link. Given the open radio link, suitable methods for ensuring that the enemy can't capture or block the control link are critical.

The vehicle will also transmit data to the controller and others as implemented. This robotic defilade vehicle transmitted data would be the imagery from the cameras; status information such as fuel quantity remaining and other automotive status data; mission data; and other signals as designed. The vehicle is an unmanned ground vehicle, or UGV, and as such it is the ground based equivalent to an extremely long endurance guided missile. Control and guidance options, in addition to command guidance, may include any or all of the options available to a missile. This means a multitude of guidance options are available with minimal risk. Some of these approaches have been incorporated into U.S. patents, including those by McCall et al. U.S. Pat. No. 6,738,714; Bruemmer et al. U.S. Pat. No. 7,211,980; and Plishner Application 20070233337.

The use of any earth bound, airborne, and space based remote retransmission systems available is an integral feature of command guidance using radio linkages. This allows the system to overcome curvature of the earth issues and other problems that normally constrain ranges during tactical operations. The onboard sensors can transmit to a very remote controller as directed, and the remote controller can control multiple systems at great distances from his own position. The biggest issue in this regard is to ensure that the controller can at all times give every supported unit the attention it needs and to not become over tasked trying to operate too many machines at once. It may be necessary to limit a controller to one or two machines unless automation allows him to deal with more.

Multiple simultaneous, escorted patrols could be run throughout an entire city with real time maneuvering of the robotic defilade vehicles with no increase whatsoever in the workload of anyone in the potential line of fire except that the commander would be coordinating with the escort controllers. No one at any of the scenes would be distracted by a need to personally control the escort vehicles, although that mode would be available as an option.

Figure 15:
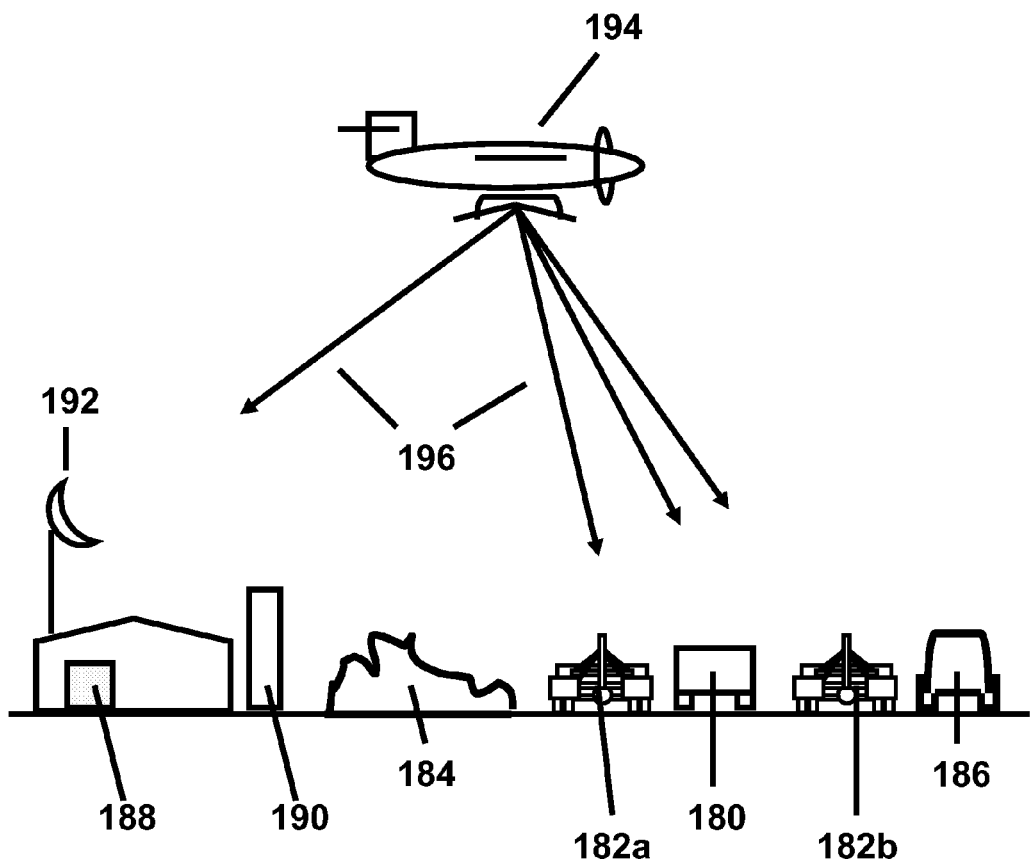
FIG. 15 depicts a patrol being supported by a remote controller.

A single such patrol is depicted in FIG. 15. In this figure the patrol leader's vehicle 180 is in between two robotic defilade vehicles 182a and 182b. They shield the patrol vehicle from potential ambush positions in the debris pile 184 and the parked car 186. The operator for the robotic defilade vehicles is in a safe position 188 inside a base behind stone walls 190. The operator has vehicle control and communications capabilities via the large antenna 192. Overhead an unmanned aerial vehicle 194 performs radio relay with real time transmissions 196 between the operator and the patrol elements.

The onboard control system employs at least one computer and is capable of at least limited autonomous operation as well as operation under the control of the remote controller. The baseline control system features instructions sent to each robotic defilade vehicle by the controller. The input device may be a joystick with control levers or some other system for providing steering, acceleration, and braking plus the ability to start and turn off the engine and to operate mission and other subsystems. This is almost identical to the approach used by the RC systems worldwide.

Alternate guidance modes are semi active homing, beam riding, semi active command to line of site, and autonomous. Linkages are radio, laser, wire, and fiber optic cable. Signals will be unambiguously addressed to specific robotic defilade vehicles and will feature encryption or other security measures as necessary to prevent either natural conditions or the enemy from being able to interfere with continuous, effective control.

An example of semi active laser homing is for an on scene controller to utilize coded lasers to indicate positions to be taken by individual robotic defilade vehicles. To implement this capability the robotic defilade vehicle being controlled would have a laser receiver capable of receiving the laser light reflected from the location marked, decoding and confirming the validity of the instructions, and entering the data into an onboard guidance controller. This is well known as laser target marking, and it has been implemented in numerous guided bombs and missiles.

Beam riding could be implemented by installing drift sensors on the vehicle and having a control beam transmitted from an on scene controller to make the vehicle go in the desired direction. This guidance is kind of like controlling the direction of a horse one is riding through the manipulation of the reins. Beam riding is a staple approach for missile guidance.

Another method for control would be to load into the vehicle's computer before the mission the coordinates of a route or path to be followed, and let the vehicle generate its own steering and driving instructions. It would do this using electronic position references such as inertial sensors and the Global Positioning System, or GPS, and it would perform the navigation computations on its own processor. This is similar to how cruise missiles sometimes work. These coordinates could be transmitted after departure as well as updates to the route, depending upon the configuration.

For local control during logistical or tactical placement the development of handheld controllers linked by wire, fiber optic cable, optical, or radio would allow people on foot to walk the vehicles to where they are needed.

While the primary mode of guidance will be command guidance, the permutations of the guidance options are numerous. All the guidance technologies have been extremely well proven, and they are well understood by designers skilled in missile guidance and in the expanding business of UGV control.

Developing the Baseline Preliminary Design—Cost

The recurring unit cost for a robotic defilade vehicle should be considerably less than $100,000 each. The price quoted on the Ford web site on 19 Aug. 2007 for a fully equipped F-450 with the 6.4 liter diesel engine, five speed automatic transmission, 4×2 drive, two wheels per side on the rear axle, and a 14,500 pound gross vehicle weight was approximately $40,000. Delivered in a configuration stripped to less than chassis cab, the automotive platform should cost less than $30,000. The remote control system can be derived from commercial unit selling for a few hundred dollars each, so a militarized version should be available for something in the single digit thousands. The rest of the robotic defilade vehicle is an armor wall; an armored exterior; the fittings and supports to mount all the added equipment; military ballistically hardened wheels with run flat tires; and assembly and delivery.

Operation of the Preferred Embodiment

Figure 16:
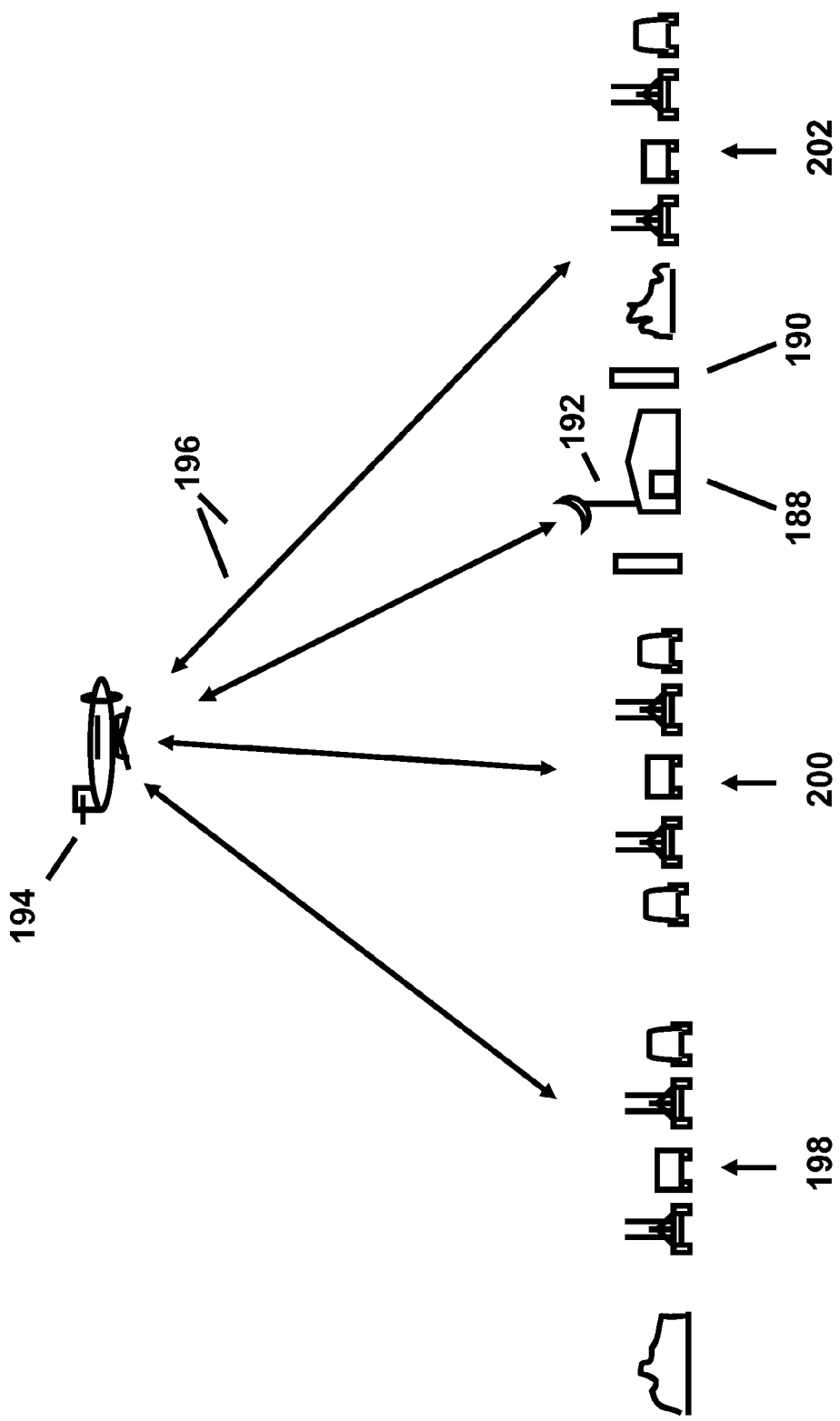
FIG. 16 depicts three patrols being supported by controllers simultaneously.

FIG. 16 depicts three simultaneous patrols in different scenarios 198, 200, and 202 around a city. The patrols are being supported by controllers 188 in a single protected location behind stone walls 190 with a powerful transmitter 192. An overhead UAV 194 allows real time communications 196 between all parties. With high altitude overhead relay such as shown in the figure these patrols could be scattered over a whole state or wider, depending upon the terrain. Barring excessive latency in the relays, any delays in the robotic defilade vehicles moving as directed by the local commander would probably be less due to the physical separation of the commander from the controller than from the time it takes for one human to respond to another's instructions.

A satellite could have been used in the illustration instead of a UAV, but there are latency issues that exist with a satellite that don't with a dedicated UAV. Latency issues can be critical when a remote device is being operated. This is why Predator UAV's operated on their missions in Afghanistan from bases in the United States are nonetheless operated exclusively for their takeoffs and landings by in country controllers.

Another major issue arises with the authorization to use a given relay asset and the authority to reassign the use of that asset. Satellites tend to be national command level assets. That means they are controlled from the Pentagon or a similar remote location with multiple layers of authority and protocol. Most UAV's are owned and controlled by local tactical commanders. This means that getting and keeping control of a relay platform at any moment is much, much less of a problem for subordinate tactical commanders when it is a UAV.

In any case where multiple methods for control are provided, a method should be provided for determining which guidance system has priority for actually having control of the driving mechanisms. There should also be an order of precedence for all the others. Such prioritization based on an algorithm or set of decision rules is well understood by persons skilled in the art of software design and development for control systems, especially in the field of missile guidance.

The robotic defilade system encompasses all the elements integrated together: barrier, carrier, and control system. Additional capabilities can be added by placing them upon the platform. To the extent that greater automation can be injected into any of the processes, then that also would be considered part of the overall system. Additional features are inherently possible by the nature of the system elements.

Operation for Assault Support

Figure 17:
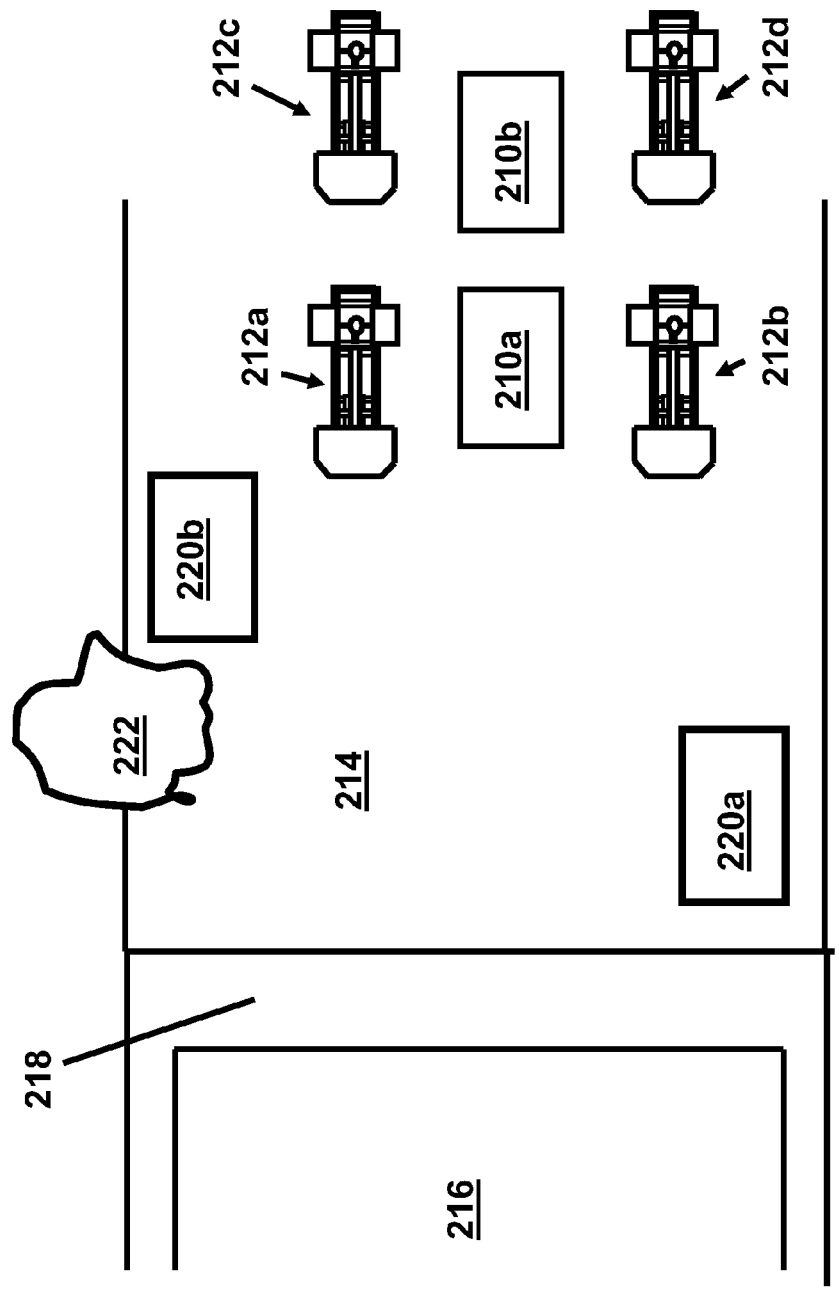
FIG. 17 depicts the disposition of forces entering a street at the start of an assault.

In FIG. 17 two manned vehicles 210a,b and four robotic defilade vehicles 212a-212d enter a street 214 and approach a building 216 wherein a raid will be conducted. The building is at the end of the street and just across a sidewalk 218. Two vehicles 220a,b are parked at the curb, and a debris pile 222 straddles the sidewalk. The robotic defilade vehicles are controlled by a remote controller who is not depicted but who is in continuous coordination with the patrol leader.

Figure 18:
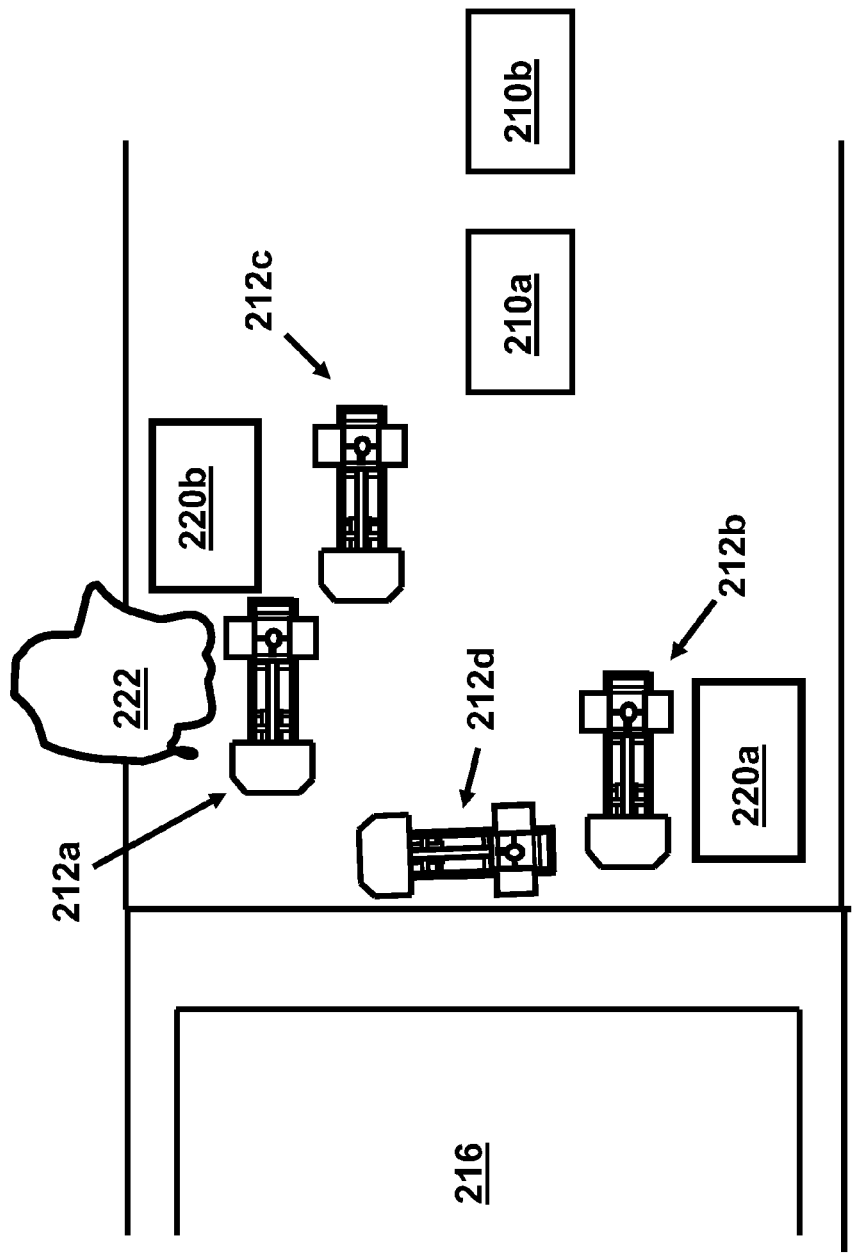
FIG. 18 depicts the positioning of the robotic defilade vehicles.

In FIG. 18 three of the four robotic defilade vehicles 212a-c have been deployed by the remote operators to protect troops assaulting the building against ambush weapons in the parked cars 220a,b or the debris pile 222. The fourth 212d has been positioned to provide physical cover in front of the target building 216. Alternative dispositions could have been made, and if the tactical situation evolves to reveal better dispositions, the barrier carriers can be repositioned as needed.

Operation for Patrol Support

Figure 19:
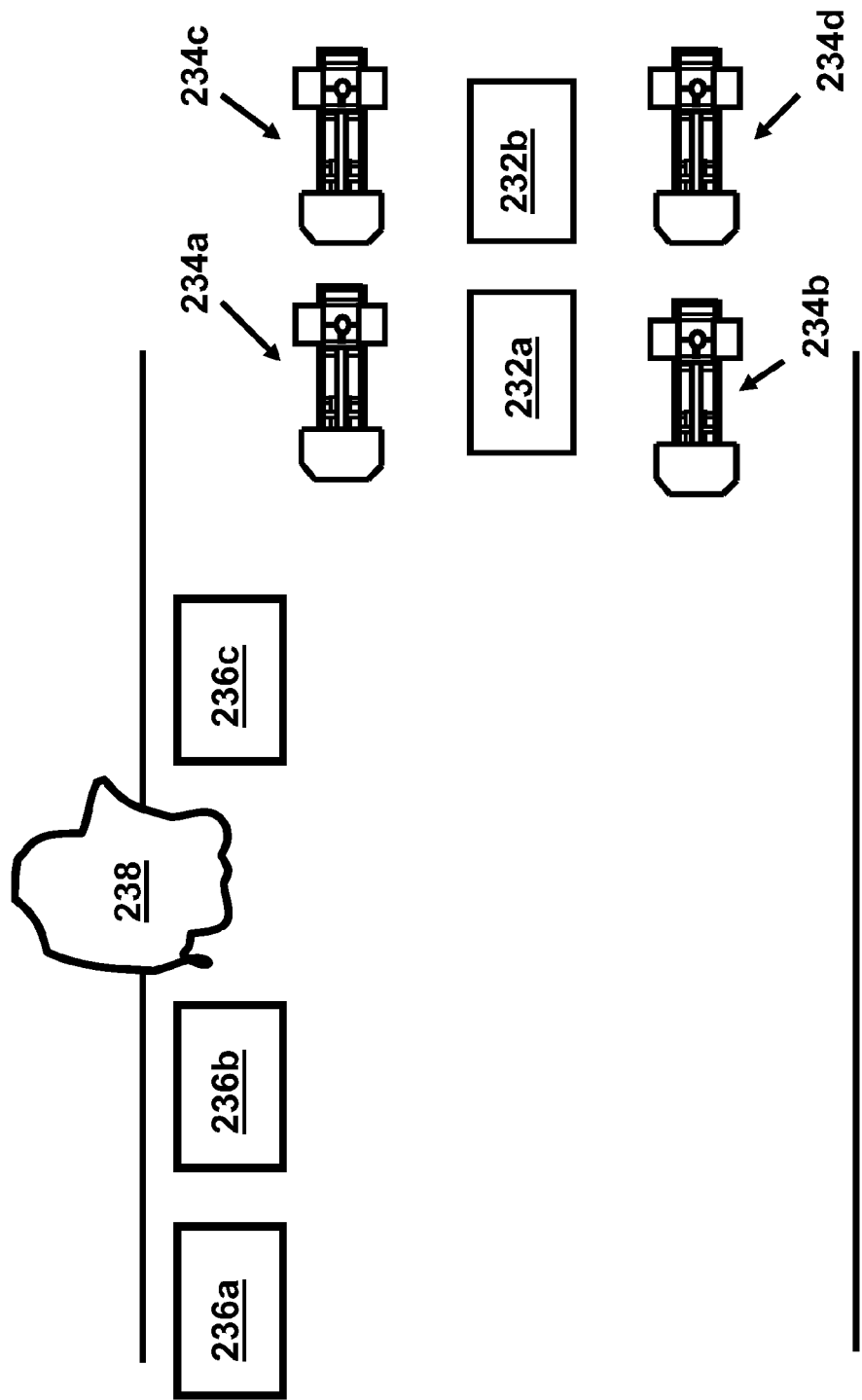
FIG. 19 depicts an escorted vehicle patrol preparing to enter a street.

FIG. 19 illustrates a vehicle patrol consisting of two manned vehicles 232a, 232b and four unmanned robotic defilade vehicles 234a-d. The street has three vehicles 236a-c parked at the curb and a pile of debris 238 adjacent to the road. The robotic defilade vehicles are controlled by a remote controller who is not depicted but who is in continuous coordination with the patrol leader.

Figure 20:
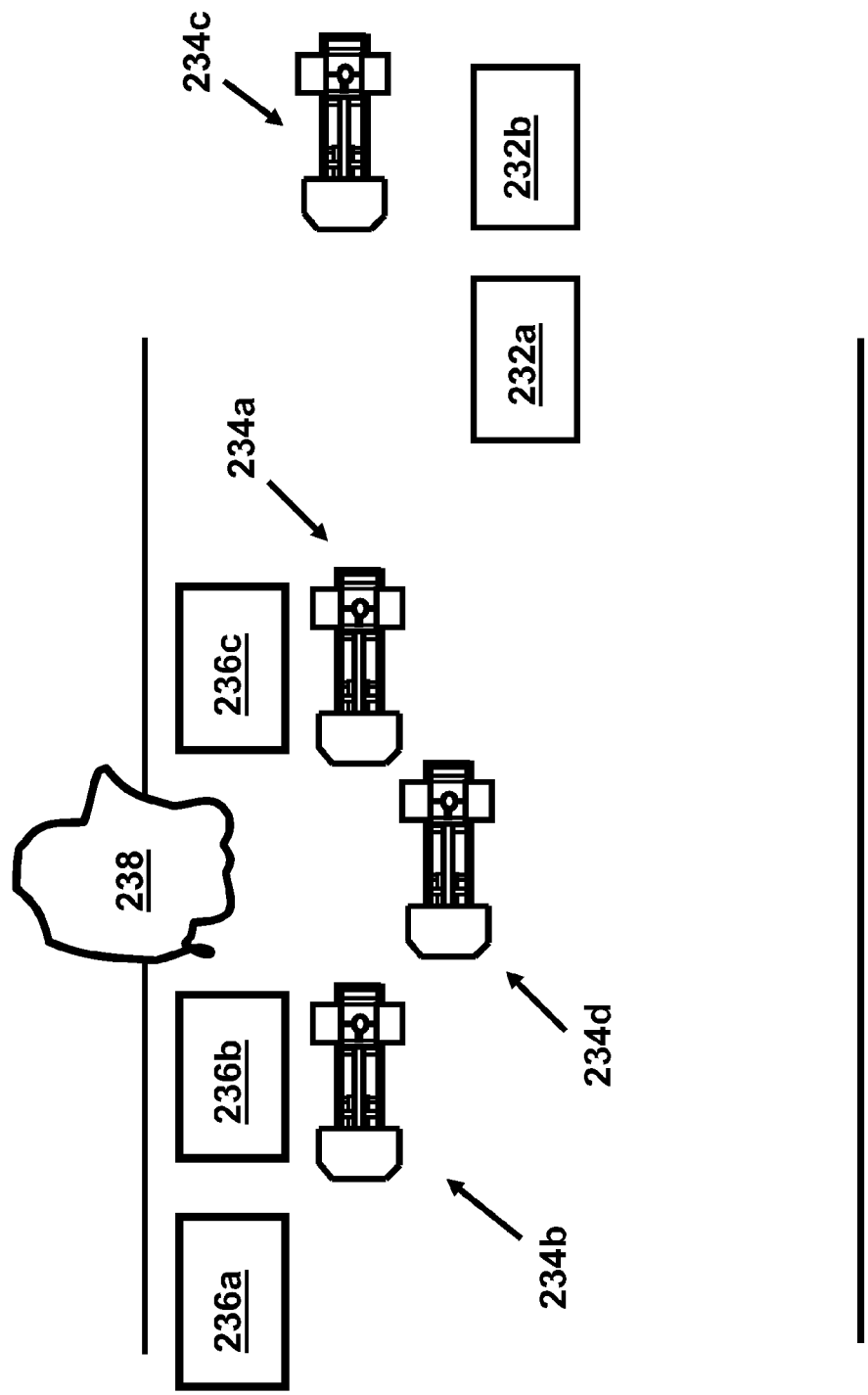
FIG. 20 illustrates the preliminary positioning of the robotic defilade vehicles.

FIG. 20 illustrates a preliminary deployment of three robotic defilade vehicles 234a, 234b, and 234d screening two parked vehicles 236b, 236c and the debris pile 238. The fourth robotic defilade vehicle 234c has been positioned to the right rear quarter of vehicles 232a,b to provide cover from that quadrant and to move in formation with the manned vehicles.

Figure 21:
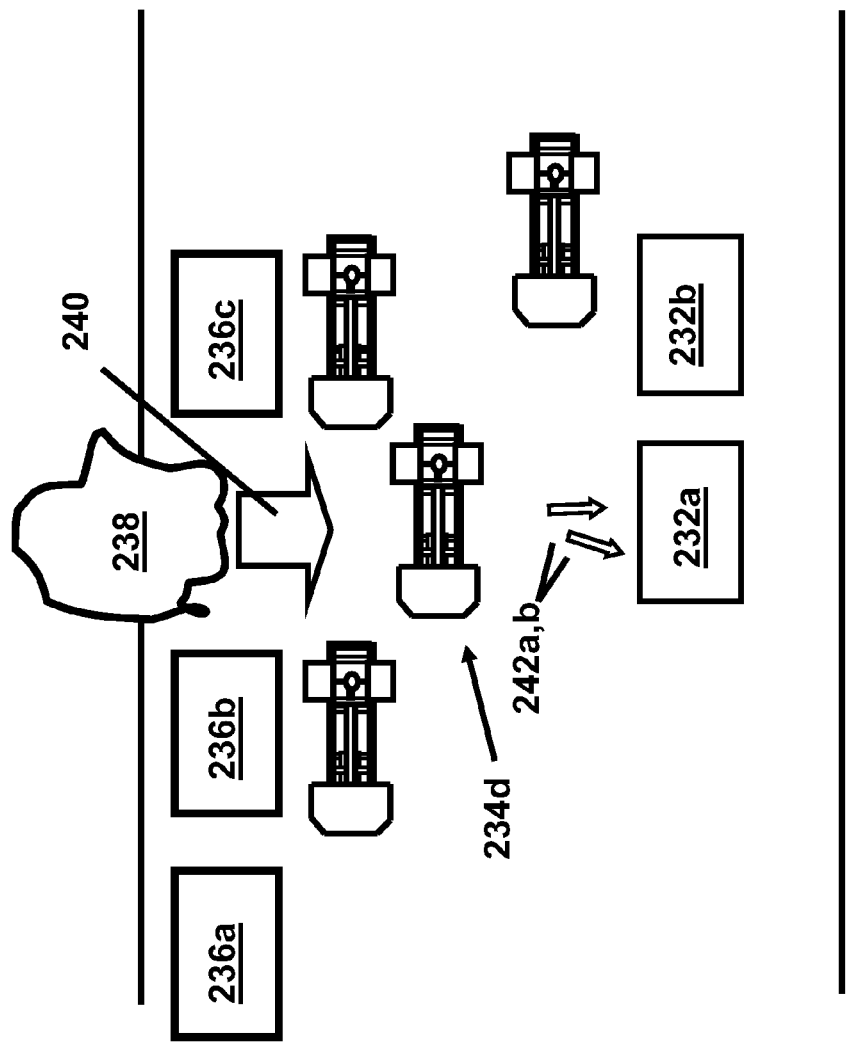
FIG. 21 depicts the situation after the patrol has been attacked.

FIG. 21 illustrates progress of the patrol. An ambush has been executed from the debris pile 238 involving firing of an EFP with an initial vector 240 at the lead manned vehicle 232a. The robotic defilade vehicle 234d adjacent to the debris pile has shielded the manned vehicle and interposed significant mass into the path of the EFP. The EFP debris, partially deenergized and partially deflected as shown by debris vectors 242a,b, strikes the target vehicle on its armor in non critical locations and fails to destroy the target or injure the occupants.

Figure 22:
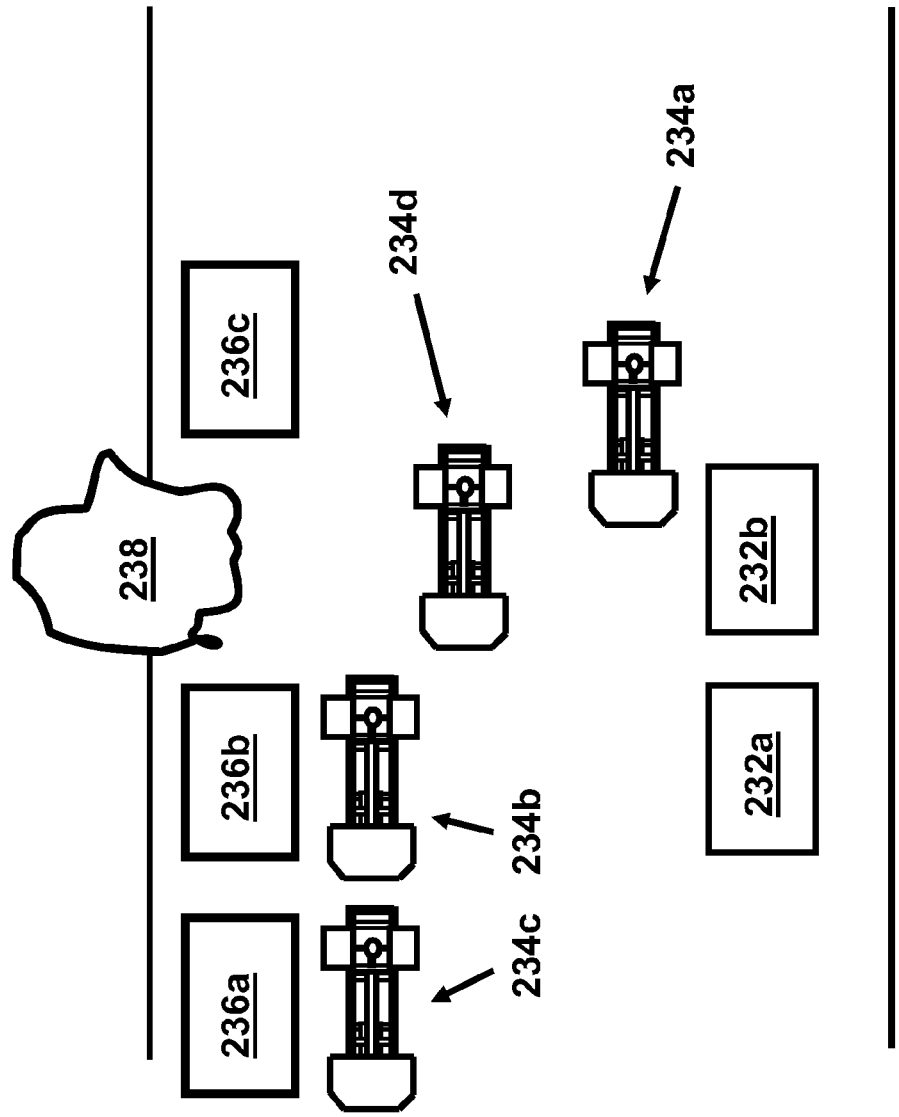
FIG. 22 shows the patrol clearing the street.

FIG. 22 shows the patrol clearing the area. The robotic defilade vehicle 234c has been maneuvered to take a position adjacent to the first parked car 236a. Robotic vehicle 234a has taken the aft flanking position on the manned vehicle 232b. The line of parked vehicles 236a-c is completely screened from the manned vehicles 232a, 232b by the robotic defilade vehicles 234a-d. Whether 234d is salvageable or not, it has successfully completed its mission and shielded 232a from a potentially lethal attack.

Additional Embodiments

The shape of the armor sheet can be varied from a constant thickness to one which is broadest at the bottom and narrowest at the top, and in other profiles. These different profiles have implications for the vehicle's roll stability and for the weapons stopping capability at each point on the surface as well as overall weight control.

While the baseline configuration depicts the armor plate barrier carried by the vehicle as being fabricated entirely of steel, alternatively a barrier composed entirely of composite materials or sandwiches of composite and metal may prove to be more effective. Materials may include aluminum; wood; composite materials including concrete and fiber composites of aramids, carbon, and glass; and other structural materials offering at least enough stiffness to trigger the detonator for the warhead of an incident missile. Steel armor brings mass while composite armor brings light weight and compressibility. Weight, durability, maintenance, versatility, and cost are critical factors in the final systems design.

Figure 23:
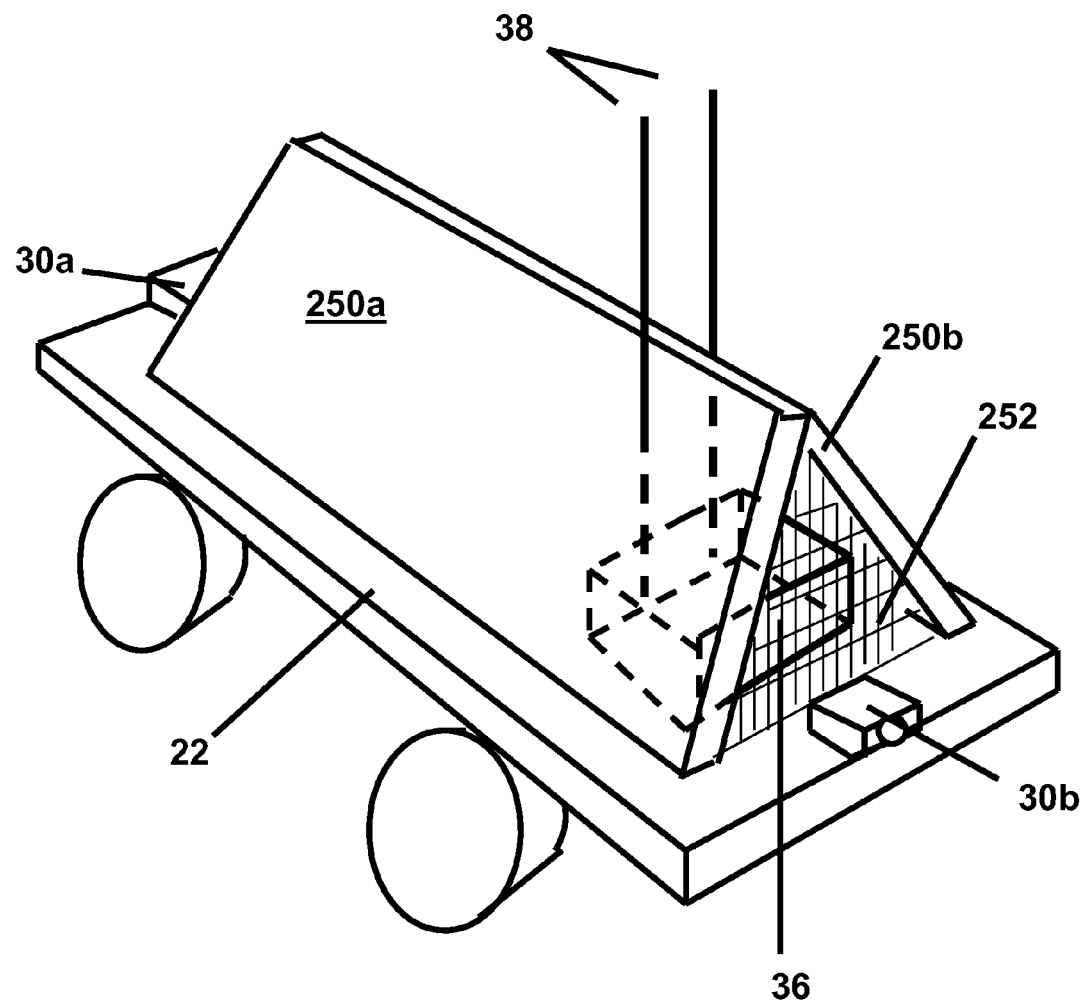
FIG. 23 illustrates an alternative, nominal, functional configuration.

FIG. 23 illustrates a variant of the functional configuration depicted in FIG. 7. The system features two walls of armor 250a, 250b which lean against each other over the longitudinal centerline of the vehicle and have their bases fixed near the periphery of the platform 22. For a given height of wall this design can not carry a total thickness of armor as great as the single sheet. That is because the inclination of the two sheets creates triangular shapes whose hypotenuses are longer than the height of the single sheet. Being longer, each must be thinner than the half thickness of the single sheet variant. A potential solution to this height disadvantage is to erect a vertical plate from the top of the junction of the two plates. The vertical plate would only be stiff enough to ensure that any warheads passing over the main barrier would at least have their fuzing triggers actuated.

The cameras 30a,b and antennas 38 in FIG. 23 are as in FIG. 7. The control system enclosure 36 is placed within the enclosure formed by the two walls. Physical barriers should be placed at the fore and aft entrances to the enclosure, the least of which would be a method to exclude hand grenades and other objects, such as the screen 252. The advantage of this design over the single sheet is greater inherent stability, which may allow higher speeds under most conditions.

The baseline configurations of the embodiments utilize only the sheet armor for the protective mechanism. Additional systems that could easily be mounted on the vehicle include layered armor or explosive reactive armor; containers of non-metallic compressible materials; liquid-filled bladders with high bursting strength; missile guidance jammers and decoys; smoke generators and smoke grenade launchers; and receivers and jammers for enemy communications transmissions which may be intended to activate cell phones or other radio devices used to trigger detonators for ambush weapons.

The embodiments disclosed herein are intended to be illustrative only, and those skilled in the art may visualize other, equivalent embodiments.

Advantages

Accordingly the reader will see that this invention provides a means for commanders to create protected defilade positions for their forces and to move the physical barriers as needed with minimal effort or distraction to those forces. The interposition of a stout barrier between the commanders' assets and the enemy firing positions will significantly degrade a much broader spectrum of tactical weapons than other available options. The risk and required development are very low, and a unit recurring price below $100,000 per vehicle should be realizable.

I claim:

1. A method for protecting objects and personnel from attack comprising:
    (a) rigorously determining the Requirements including at a minimum what is to be protected, what the threat is, what the environment is, and what constitutes success;
    (b) selecting a substantial physical barrier that will support the mission and defeat the threat specified;
    (c) selecting a vehicle as carrier that can carry said substantial physical barrier reliably throughout the required environments;
    (d) designing the vehicle's armor system to protect the carrier vehicle itself and to complement said substantial physical barrier in shielding the protected object in accordance with the Requirements;
    (e) selecting a command and control system for the vehicle and the controller that will support the Requirements;
    (f) integrating said substantial physical barrier, the carrier vehicle, the carrier vehicle armor, and the command and control system and formally developing the production data package through an iterative set of steps incorporating successively greater levels of detail in the configurations designed and tested;
    whereby the performance standard set forth in the Requirements is met.

2. A substantial physical barrier which self-transports, is unmanned, is expendable, and is able to be remotely controlled or to generate guidance instructions for itself using onboard machine logic so as to position itself in a stationary or moving position between a stationary or moving protected object and a possible threat to said protected object and to maintain said position except as updated by externally or internally generated updated instructions and thereby to create a protected lee for said protected object behind a passive, physical, solid, non-pyrotechnical barrier that, once in place, is always on, has no reaction or recycle time whatsoever, and has an unlimited duty cycle and which can completely or partially block the destructive effects of the firing, detonation, or dispersal of weapons from a group including bullets and kinetic energy weapons, blast weapons, fragmentation weapons, flame weapons, the kill mechanisms of all three variants of shaped charge warheads, and the high explosive squash head.

3. The barrier of claim 2 wherein said substantial physical barrier comprises a plurality of devices and systems from a group including a mission armor payload structure comprising one or more penetration-resistant walls attached to the vehicle in a vertical, horizontal, or slanted orientation plus their supports and mounting devices and the armor, engine, ladder frame, transmission, gearboxes, and other structure of the vehicle carrying said mission armor payload structure, the strength of said substantial physical barrier being the optimized integrated assembly of its subsystems and components and their large cross section in the plane through which destructive devices must pass.

4. The barrier of claim 3 wherein the armor for said mission armor payload structure and for said vehicle carrying said mission armor payload structure is from a group including steel, aluminum, other metals, alloys, ceramics, concrete, construction materials, and containers of fluid.

5. The barrier of claim 2 wherein the guidance and control system for the vehicular component uses guidance and control similar to that proven in guided missiles and unmanned aerial vehicles including remote control or self-generated guidance or both based on pre-programmed or downloaded instructions and using technical approaches from a group including cameras on the vehicle sending imagery to the controller; inertial, GPS, or other position-determination systems; and command, semi-active command-to-line-of-sight, semi-active homing, beam riding, and autonomous guidance mechanisms.

6. The barrier of claim 5 wherein the agent controlling the vehicle uses linkages to the onboard control systems from a group including wire and fiber optic cable; radio and electro-optical transmissions; and relays via ground-based relays, unmanned aerial vehicles and other aircraft, and satellites.

* * * * *